United States Patent
Chen et al.

(10) Patent No.: US 10,613,295 B2
(45) Date of Patent: Apr. 7, 2020

(54) TRI-AXIS CLOSE-LOOP FEEDBACK CONTROLLING MODULE FOR ELECTROMAGNETIC LENS DRIVING DEVICE

(71) Applicant: TDK Taiwan Corp., Taipei (TW)

(72) Inventors: Shu Shan Chen, Taoyuan County (TW); Chao Chang Hu, Taoyuan County (TW); Wen Chang Lin, Taoyuan County (TW)

(73) Assignee: TDK Taiwan Corporation, Taipei (TW)

( * ) Notice: Subject to any disclaimer, the term of this patent is extended or adjusted under 35 U.S.C. 154(b) by 380 days.

(21) Appl. No.: 15/706,915

(22) Filed: Sep. 18, 2017

(65) Prior Publication Data

US 2018/0003921 A1  Jan. 4, 2018

Related U.S. Application Data

(63) Continuation of application No. 14/268,205, filed on May 2, 2014, now abandoned.
(Continued)

(51) Int. Cl.
*G02B 13/00* (2006.01)
*G02B 27/64* (2006.01)
*G02B 7/09* (2006.01)
*H04N 5/232* (2006.01)
*G02B 7/08* (2006.01)

(52) U.S. Cl.
CPC ............ *G02B 13/001* (2013.01); *G02B 7/08* (2013.01); *G02B 7/09* (2013.01); *G02B 27/646* (2013.01); *H04N 5/23287* (2013.01); *G03B 2205/0015* (2013.01)

(58) Field of Classification Search
CPC ........ G02B 13/001; G02B 7/02; G02B 7/023; G02B 7/04; G02B 7/08; G02B 7/09; G02B 7/28; G02B 7/285; G02B 27/64; G02B 27/646–648; G02B 15/14–15; G02B 3/10; G02B 5/02; H04N 5/23248; H04N 5/23251; H04N 5/23258; H04N 5/23264; H04N 5/2328; H04N 5/23287; G03B 2205/0007–0015; G03B 2205/0023; G03B 13/34; G03B 13/36; G03B 2217/005
See application file for complete search history.

(56) References Cited

U.S. PATENT DOCUMENTS

2014/0255016 A1* 9/2014 Kim ..................... G02B 27/646
                                                                396/55

* cited by examiner

*Primary Examiner* — Stephone B Allen
*Assistant Examiner* — Adam W Booher

(57) ABSTRACT

The tri-axis close-loop feedback controlling module for electromagnetic lens driving device comprises a 6-pin Hall element. Two pins of the Hall element are coupled to an auto-focus module for providing a current to drive the auto-focus module to conduct auto-focusing operations along the Z-axis; while other four pins of the Hall element are coupled to a control unit. The control unit detects the X-Y axial positions of the auto-focus module relative to an OIS module and generates a control signal which is then sent to the Hall element. Therefore, the Hall element not only can provide its own feedback controlling function according to the Z-axial position of lens, but also can drive the auto-focus module based on the control signal corresponding to the X-Y axial positions of the auto-focus module, so as to achieve the goal of tri-axis close-loop feedback controlling for the electromagnetic lens driving device.

12 Claims, 20 Drawing Sheets

Related U.S. Application Data

(60) Provisional application No. 61/819,737, filed on May 6, 2013.

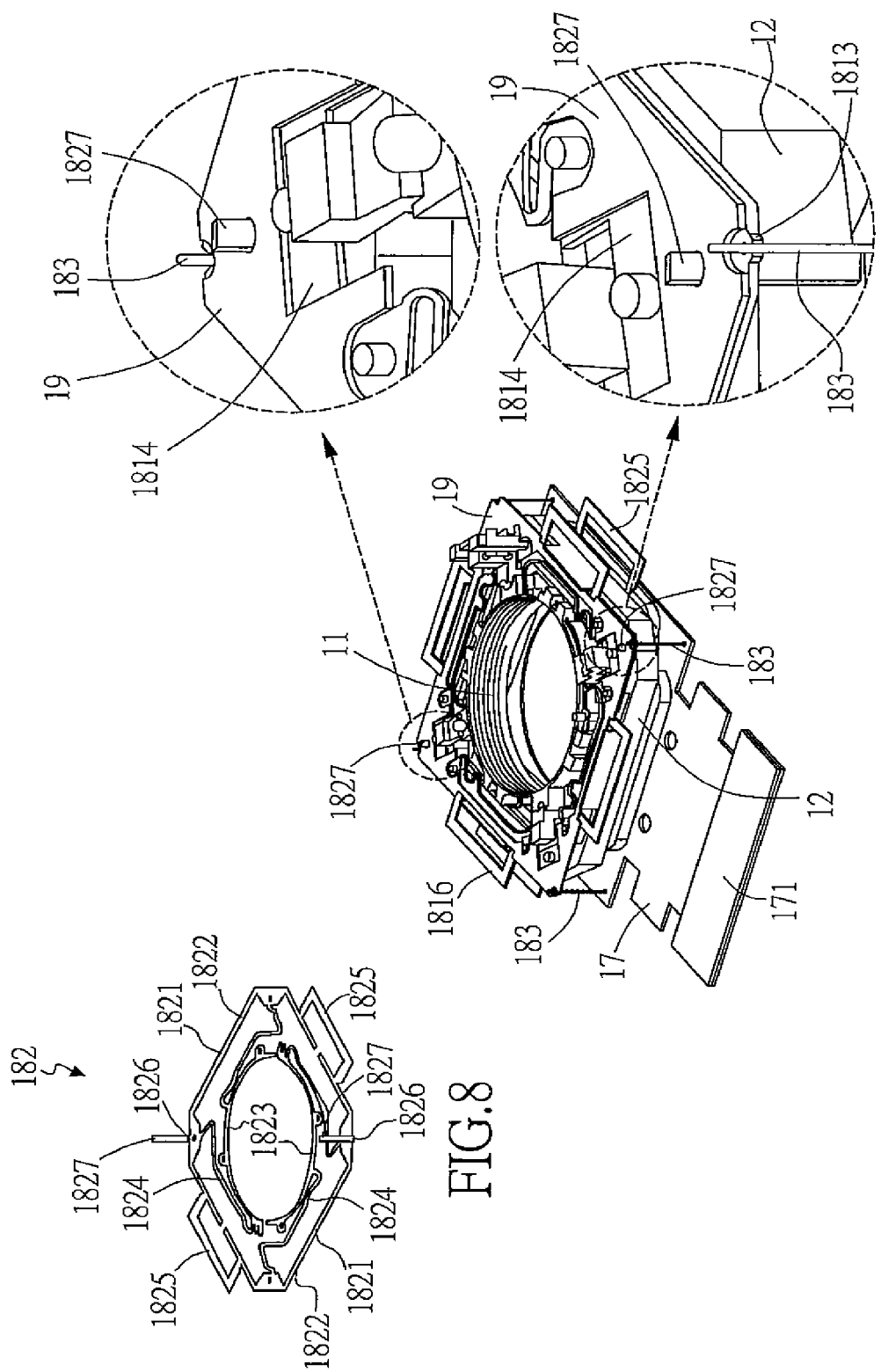

TRI-AXIS CLOSE-LOOP FEEDBACK CONTROLLING MODULE FOR ELECTROMAGNETIC LENS DRIVING DEVICE

BACKGROUND OF INVENTION

This is a non-provisional application of PPA Ser. No. 61/819,737 filed on May 6, 2013, whose disclosures are incorporated by this reference as though fully set forth herein.

1. Field of the Invention

The invention refers to a tri-axis close-loop feedback controlling module for electromagnetic lens driving device, which employs a 6-pin Hall element to allow the electromagnetic lens driving device to control the focusing operations of the auto-focus module along the Z-axis based on a control signal generated according to the X-and-Y axial positions of the auto-focus module, so as to achieve the functions of tri-axis close-loop feedback control.

2. Description of the Prior Art

Digital photography technology has been widely applied to most of the portable electronic devices such as the cellular phones. Various miniaturized techniques in the lens module are involved to make all these applications possible; in particular, the voice coil motor (VCM) technique. The VCM introduces a combination of coiled magnets and spring plates to drive a lens to move back and forth along a photo axis for image-capturing, so as to perform auto-zooming and/or auto-focusing of the lens module. Further, in this trend of demanding for devices capable of high-level photographing functions, photographic quality and various camera functions such as thousand pixels, anti-hand shake ability and so on are equipped to distinguish high-end camera from cost-down level. However, in an optical system composed of an optic lens module, such as a camera system or a video recorder system, hand shake or some external situations usually occur to alter optical path so as to degrade the imaging upon the image-compensation module and further to obscure the formation of the images. A conventional resort to resolve this problem is to introduce a further compensation mechanism for overcoming possible shaking during the imaging. Such a compensation mechanism can be either digital or optical. State of the art digital compensation mechanism is to analyze and process the digital imaging data capturing by the image-compensation module, so as to obtain a clearer digital image. Such a mechanism is also usually called as a digital image stabilization (DIS) mechanism. On the other hand, the optical compensation mechanism, usually called as an optical image stabilization (OIS) mechanism, is to add a shake-compensation module upon the lens module or the image-compensation module.

However, conventional technologies usually employ two different and yet independent control circuitries for the feedback circuits of the auto-focus module and the OIS module in the same camera device. That means, one control circuitry is used for receiving feedback signals of the auto-focus module and also controlling the auto-focus module based on the feedback signals, while another control circuitry is used for controlling the OIS module based on the feedback signals of the OIS module. More particularly, in the conventional technologies, a feedback circuit is individually furnished for detecting and generating a feedback signal according to the position and movement of the lens along its optical path (usually also called as the Z-axis), and thus the auto-focus module can control and drive the lens to move along the Z-axis according to the feedback signal so as to conduct auto-focusing operations; in the other hand, another feedback circuit is individually furnished for detecting and generating another feedback signal according to the position and movement of the lens along a horizontal plane perpendicular to the optical path (usually also called as the X-Y axial plane), and thus the OIS module can control and drive the lens to move along the X-Y axes according to said another feedback signal so as to conduct OIS operations. In the conventional technologies, the auto-focus module cannot receive any feedback signals from the OIS module when performing the Z-axial auto-focusing operations. However, when the OIS module is performing the OIS operations in order to compensate the biased position of the lens caused by shakings, the OIS module will move the X and Y axial positions of the lens, and thus the precise focusing position (Z-axial position) of the lens will also be changed accordingly. Which means, when the OIS module is performing the OIS operations, the auto-focus module is also required to perform and adjust its auto-focusing operations continuously. Unfortunately, because conventional technologies use two different and independent control and feedback circuits for the auto-focus module and OIS module to detect and control the movements of lens in the Z-axis and X-Y axes respectively, thus the responding and interacting speeds of the auto-focus module is relatively slower and delayed, which will cause delayed focusing operations when shakings occur. In addition, because the entire lens module (including lens and auto-focus module) is movable horizontally relative to the OIS module, the circuitry design is very difficult for conventional technologies if someone try to integrate the feedback circuit of the auto-focus module with the feedback circuit of the OIS module into one single circuitry.

SUMMARY OF THE INVENTION

Accordingly, it is the primary object of the present invention to provide a tri-axis close-loop feedback controlling module for electromagnetic lens driving device which comprises a 6-pin Hall element. Two pins of the 6-pin Hall element are coupled to the auto-focus module for providing a current to the auto-focus module in order to drive the auto-focus module to conduct the auto-focusing operations along the X-axis; while other four pins thereof are coupled to a control unit. The control unit can detect the signals generated by the OIS module to obtain the X-Y axial positions of the auto-focus module relative to the OIS module, so as to generate a control signal according to the X-Y axial position of the auto-focus module, and then send the control signal to the 6-pin Hall element. Therefore, the 6-pin Hall element not only can provide its own feedback controlling function according to the Z-axial position of lens, but also can accept the control signal from the control unit and then providing the current for driving the auto-focus module based on the control signal from the control unit, so as to achieve the goal of tri-axis close-loop feedback controlling for the electromagnetic lens driving device.

Another object of the present invention is to provide a tri-axis close-loop feedback controlling module for electromagnetic lens driving device, which comprises a novel electric coupling structure to couple the six pins of the 6-pin Hall element with the circuitries of both the auto-focus module and the OIS module that are movable relative to each other, such that the goal of tri-axis close-loop feedback controlling for the electromagnetic lens driving device can be achieved.

In order to achieve aforementioned objects, the present invention discloses a tri-axis close-loop feedback controlling module for electromagnetic lens driving device, which comprises:

a lens holder for holding a lens;

a movable frame for receiving the lens holder in such a manner that the lens holder is movable relative to the movable frame along a Z-axis direction;

an electromagnetic driving, module, furnished between the movable frame and the lens holder for driving the lens holder to move within the movable frame along the Z-axis direction;

an optical image stabilization (OIS) module for driving the movable frame together with the lens holder to perform bi-directional movements along a X-axis direction and a Y-axis direction; wherein the X-axis, Y-axis and Z-axis are perpendicular to each other;

a control unit, coupled to the OIS module; the control unit being able to detect and control operations of the OIS module so as to generate a control signal according to the operations of the OIS module; and a Hall element having at least six pins; wherein, two of the at least six pins are coupled with the electromagnetic driving module for supplying a current to the electromagnetic driving module in order to control operations of the electromagnetic driving module; other four of the at least six pins are coupled with the control unit for receiving the control signal from the control unit in order to control the current supplied to the electromagnetic driving module based on the control signal, so as to achieve the function of tri-axis close-loop feedback controlling the electromagnetic driving module.

In a preferred embodiment, the tri-axis close-loop feedback controlling module for electromagnetic lens driving device further comprises:

a first circuit board; the control unit being furnished on the first circuit board and coupled with the OIS module; and an electric coupling structure; the Hall element being coupled with the electromagnetic driving module and the control unit be means of the electric coupling structure;

wherein, the electric coupling structure comprises a first spring plate located at one side of the lens holder along the Z-axis direction; the first spring plate comprises at least four independent and separated first spring members; each one of these first spring members comprises a first inner rim for flexibly retaining a top position of the lens holder along the Z-axis direction and a first contact which is connected with one suspension wire; each one of the suspension wires extends from the first spring members toward the first circuit board and couples to the control unit; the Hall element is coupled with the four first spring members and the electromagnetic driving module, and can receive a control signal from the control unit in order to control and adjust a current provided by the Hall element to the electromagnetic driving module;

wherein the first spring plate is in the form of hollowed out thin metal plate; in addition, each one of the first spring members of first spring plate comprises: a first outer rim connected to the movable frame, a first inner rim connected to the lens holder, at least one first inner string extending and connecting between the first outer rim and the first inner rim, and a first contact located at the first outer rim; each one of the suspension wires has its one end thereof being correspondingly connected to one of the first contacts;

wherein the electromagnetic lens driving device further comprises a second circuit board; the Hall element is furnished on the second circuit board; a sensing magnet for Z-axis position is furnished on the lens holder at a location corresponding to the Hall element; in addition, the end of each suspension wire which is connected to the first contact is coupled with the second circuit board, and thus is further coupled to one of the pins of the Hall element via the second circuit board.

In a preferred embodiment, the electric coupling structure further comprises a second spring plate located at a lower side of the lens holder along the Z-axis direction opposite to the first spring plate; the second spring plate comprises at least two individual and separated second spring member; each one of the second spring members comprises: a second outer rim connected to the movable frame, a second inner rim fixed on the lens holder for flexibly retaining a bottom position of the lens holder along the Z-axis direction, at least one second inner string extending and connecting between the second outer rim and the second inner rim, and a second contact located at the second outer rim; wherein the electromagnetic driving module comprises at least a driving coil furnished on the lens holder and at least two driving magnets mounted on the movable frame and corresponding to the driving coil; wherein the second inner rim of each second spring member is electric coupled with the driving coil of the electromagnetic driving module; in addition, the second contact of each second spring member is coupled to the second circuit board and thus is further coupled with one of the pins of the Hall element.

In a preferred embodiment, the second contact of each one of the second spring members is coupled to the second circuit board by means of one of the following structures: bending a thin elongated extending part extended from the second contact toward the second circuit so as to let an end of the extending part connect to the second circuit board, and soldering a connecting wire at the second contact and let an end of the connecting wire connect to the second circuit board.

In a preferred embodiment, the first spring plate includes at least six independent and separated first spring members; wherein, among these six first spring members, there are four first spring members that each of these four first spring members includes the first contact which is coupled with the control unit by means of the suspension wire; while the other two first spring members do not connect to the suspension wires and are coupled to the electromagnetic driving module via the first inner rim;

wherein the electromagnetic driving module comprises at least a driving coil furnished on the lens holder and at least two driving magnets mounted on the movable frame and corresponding to the driving coil;

wherein the first inner rim of each one of the other two first spring members is coupled with the coil of the electromagnetic driving module; in addition, the first outer rim of each one of the other two first spring members is coupled to the second circuit board and is further coupled to one of the pins of the Hall element in order to supply the current to the electromagnetic driving module in order to control operations of the electromagnetic driving module.

In a preferred embodiment, the OIS module comprises:

at least a first stabilizing coil furnished on the first circuit board and coupled to the control unit;

at least a second stabilizing coil furnished on the first circuit board and are perpendicular to the first stabilizing coils; in addition, the second stabilizing coils being coupled to the control unit;

at least a first stabilizing magnet mounted on the movable frame and corresponding to the first stabilizing coil;

at least a second stabilizing magnet mounted on the movable frame and corresponding to the second stabilizing coil; and at least two position sensors mounted on the first circuit board and coupled to the control unit; the at least two position sensors being used to detect the position of the movable frame relative to the first circuit board along the X-axis direction and the Y-axis direction;

wherein, the first and second stabilizing magnets are the same with the driving magnets of the electromagnetic driving module.

All these objects are achieved by the suspension mechanism for an optical image anti-shake device described below.

BRIEF DESCRIPTION OF THE DRAWINGS

The present invention will now be specified with reference to its preferred embodiment illustrated in the drawings, in which:

FIG. 8 is the perspective assembled view of the detailed positions of the second spring plate of the electromagnetic lens driving device according to the present invention's first embodiment;

FIG. 9 is the p partial cross-sectional view of the detailed positions of the second spring plate of the electromagnetic lens driving device according to the present invention's first embodiment;

DESCRIPTION OF THE PREFERRED EMBODIMENT

The tri-axis close-loop feedback controlling module for electromagnetic lens driving device according to the present invention comprises a 6-pins Hall Magnetic Sensing Element (also referred as 6-pin Hall element hereinafter). Two pins of the 6-pin Hall element are coupled to an auto-focus module for providing a current to the auto-focus module in order to drive the auto-focus module to conduct the auto-focusing operations along the Z-axis; while other four pins of the 6-pin Hall element are coupled to a control unit. The control unit can detect the signals generated by an OIS module to obtain the X-Y axial positions of the auto-focus module relative to the OIS module, so as to generate a control signal according to the X-Y axial position of the auto-focus module, and then send the control signal to the 6-pin Hall element. Therefore, the 6-pin Hall element not only can provide its own feedback controlling function according to the Z-axial position of lens, but also can accept the control signal from the control unit and then providing the current for driving the auto-focus module based on the control signal received from the control unit, so as to achieve the goal of tri-axis close-loop feedback controlling for the electromagnetic lens driving device.

Figure 1:
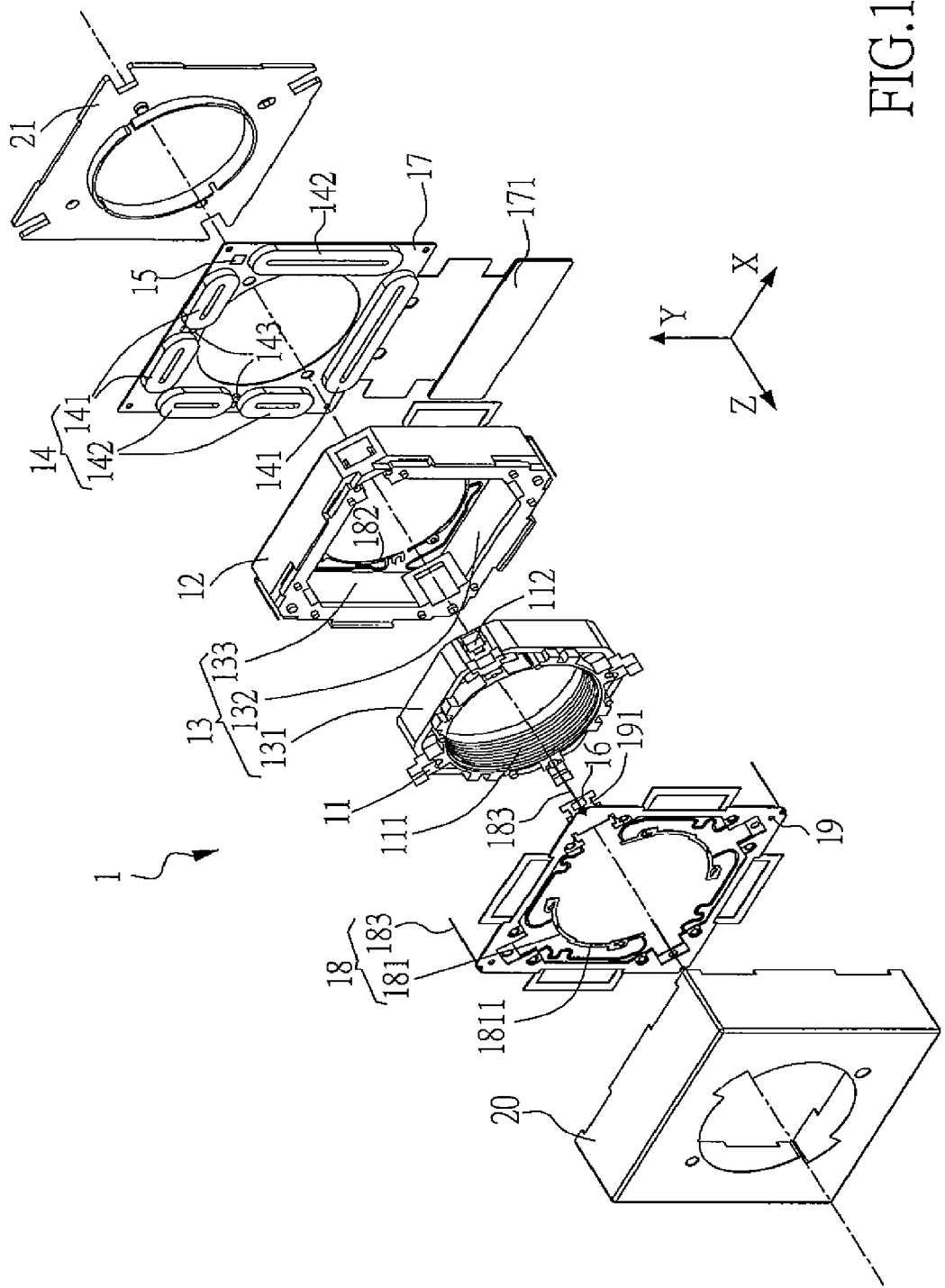
FIG. 1 and is a front-side schematic exploded view of the tri-axis close-loop feedback controlling module for the electromagnetic lens driving device according to a first embodiment of the present invention.
Figure 2:
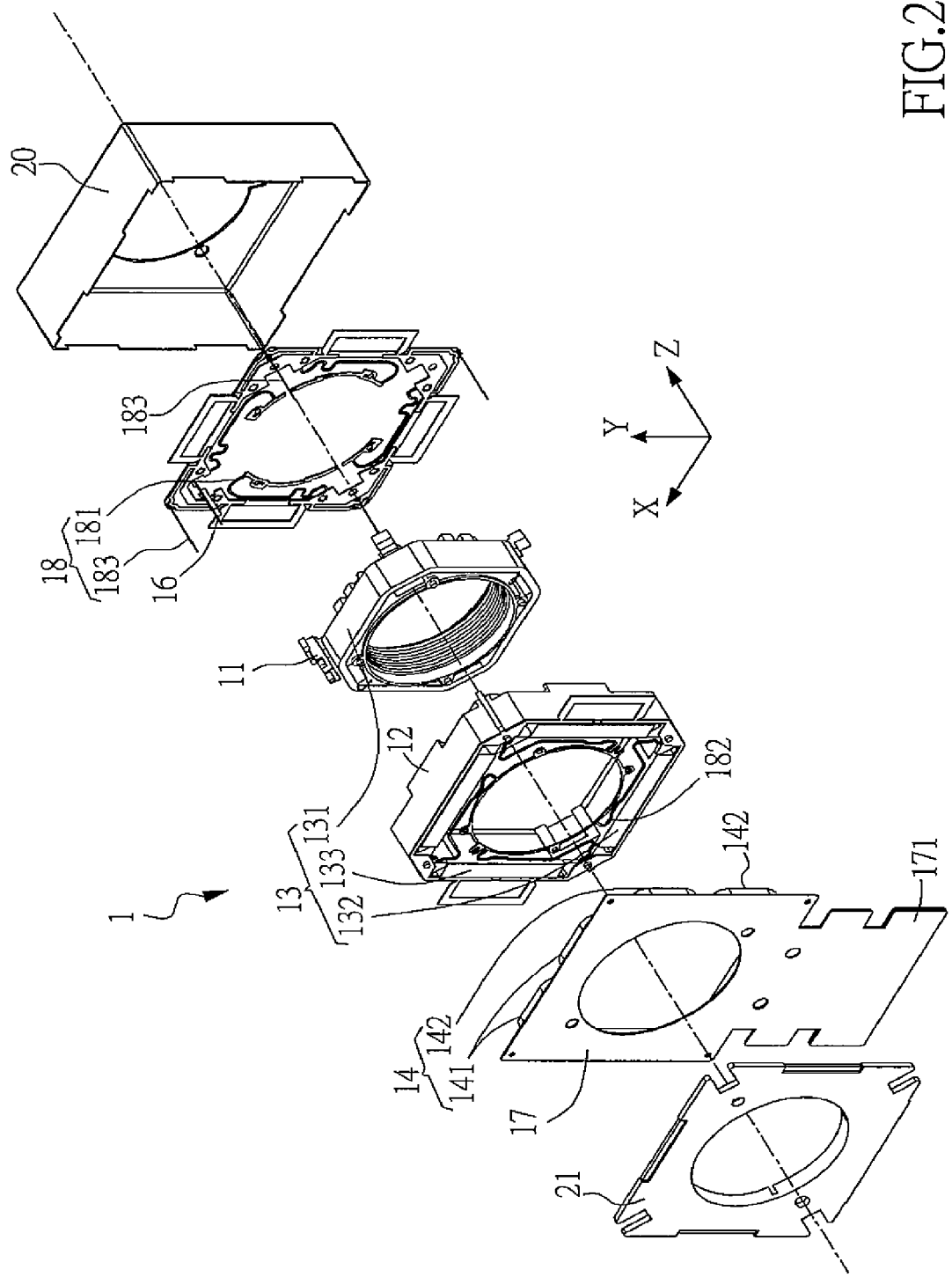
FIG. 2 is a rear-side schematic exploded view of the tri-axis close-loop feedback controlling module for the electromagnetic lens driving device according to a first embodiment of the present invention.
Figure 11A:
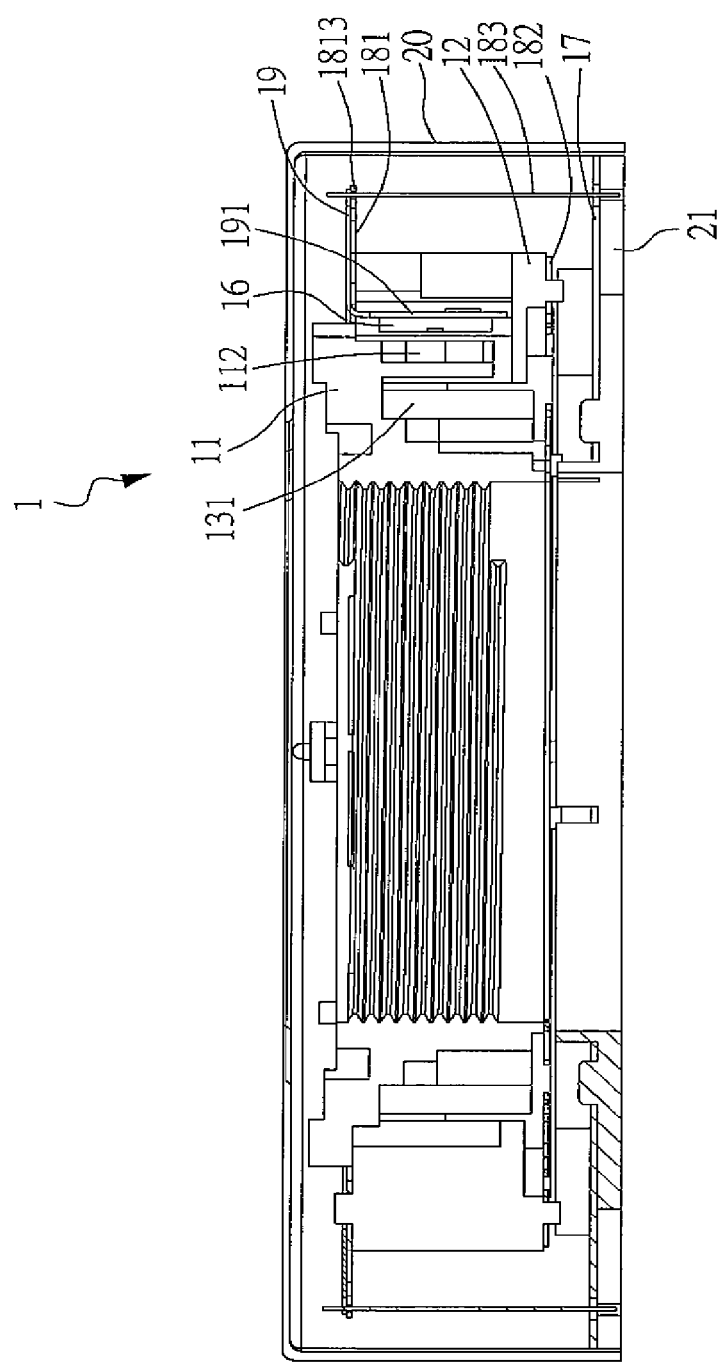
FIGS. 11A and 11B are respectively a 45-degree cross-sectional view without cross-sectional lines and a 45-degree cross-sectional view with cross-sectional lines of the first embodiment of the electromagnetic lens driving device shown in FIG. 1 and FIG. 2.
Figure 11B:
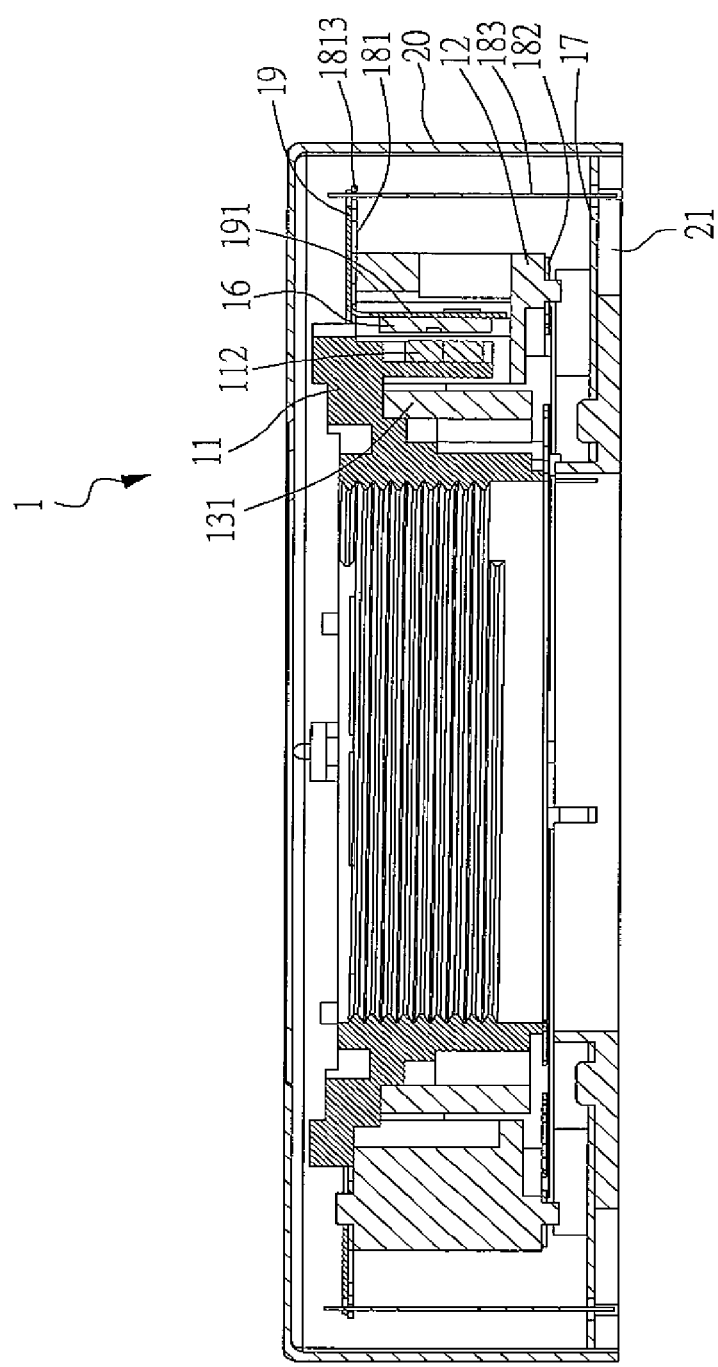
Figure 16:
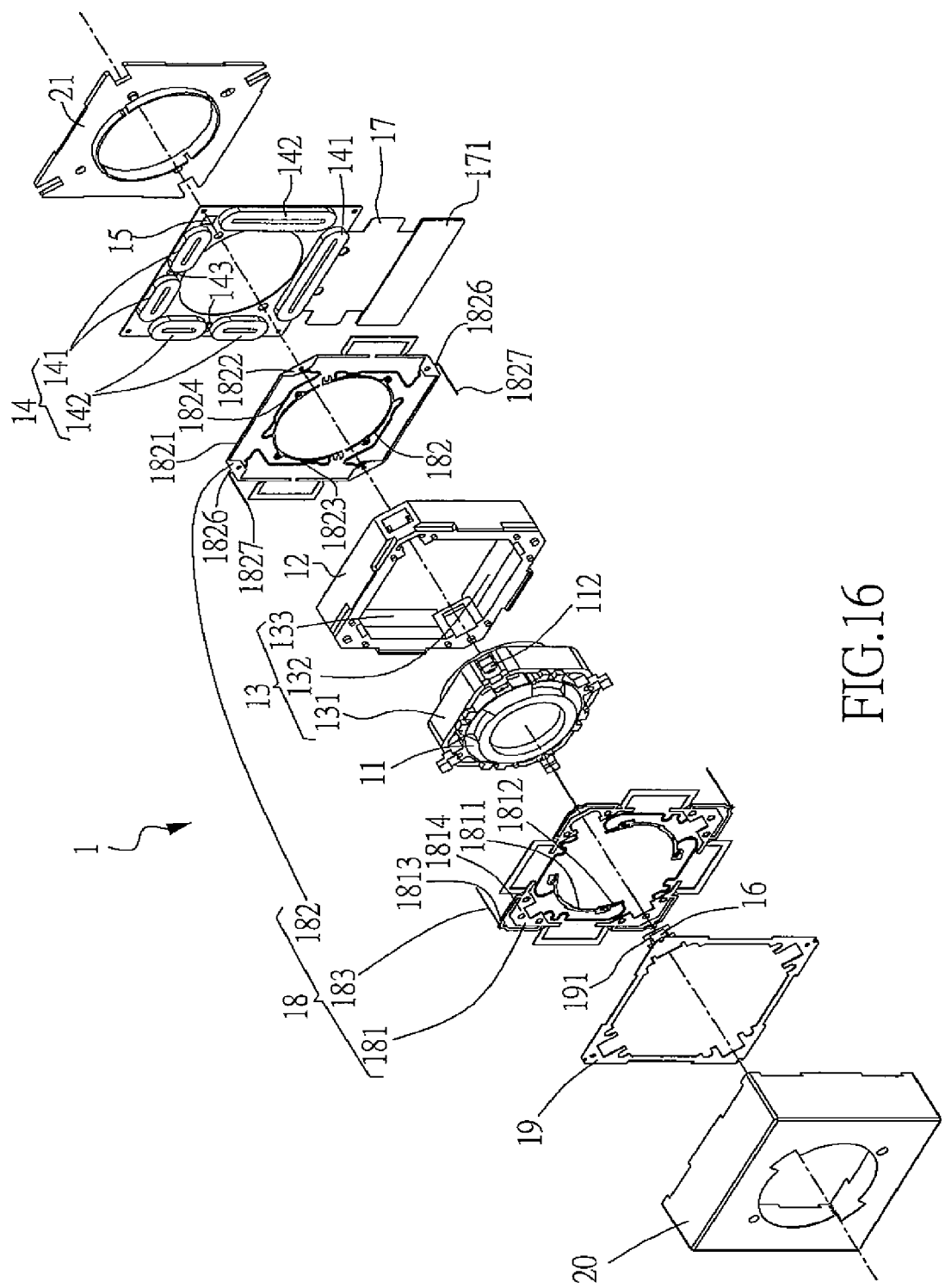
FIG. 16 is a schematic exploded view of the first embodiment of the electromagnetic lens driving device shown in FIG. 1, in which the first spring plate and the second spring plate are also exploded.

Please refer to FIG. 1, FIG. 2, FIG. 11A, FIG. 11B and FIG. 16. In which, FIGS. 1 and 2 are respectively a front-side schematic exploded view and a rear-side schematic exploded view of the tri-axis close-loop feedback controlling module for the electromagnetic lens driving device according to a first embodiment of the present invention. FIGS. 11A and 11B are respectively a 45-degree cross-sectional view without cross-sectional lines and a 45-degree cross-sectional view with cross-sectional lines of the first embodiment of the electromagnetic lens driving device shown in FIG. 1 and FIG. 2. FIG. 16 is a schematic exploded view of the first embodiment of the electromagnetic lens driving device shown in FIG. 1, in which the first spring plate and the second spring plate are also exploded.

In the first embodiment of the present invention, the tri-axis close-loop feedback controlling module for the electromagnetic lens driving device 1 comprises: a lens holder 11, a moveable frame 12, an electromagnetic driving module 13, an optical image stabilization (OIS) module 14, a control unit 15, a Hall element 16 having at least six pins (also referred as 6-pin Hall element), a first circuit board 17, an electric coupling structure 18, a second circuit board 19, a casing 20 and a bottom cover 21.

The lens holder 11 is for receiving a lens (not shown in FIGS. 1 and 2) therein. Generally speaking, the lens is screwed into the threads 111 formed on the inner surface of the central through hole of the lens holder 11 in a removable manner.

The movable frame 12 is a hollow frame structure having an inner compartment for receiving the lens holder 11 in such a manner that, the lens holder 11 is movable a Z-axis direction relative to the movable frame 12 along in a limited manner.

The electromagnetic driving module 13 is furnished between the movable frame 12 and the lens holder 11 and is for driving the lens holder 11 together with the lens to move along the Z-axis relative to the movable frame 12, so as to perform the auto-focusing and/or zooming operations along the direction of Z-axis. In this first embodiment, the electromagnetic driving module 13 comprises at least a driving coil 131 and at least two driving magnets 132, 133.

The driving coil 131 is furnished on the lens holder 11 by means of having the driving coil 131 winding around the outer rim, of the lens holder 11. The at least two driving magnets 132, 133 comprises four magnets which are respectively mounted on four sides of the movable frame 12 corresponding to the driving coil 131 and are equally spaced apart from each other. Thereby, when applying a current to the driving coil 131 of the electromagnetic driving module 13, a magnetic pushing force along the Z-axis direction will be generated among the driving coil 131 and these driving magnets 132, 133, such that the lens holder 11 together with the lens thereinside will be moved by the force along the Z-axis linearly respective to the movable frame 12, so as to achieve the functions of auto-focusing and/or zooming.

The OIS module 14 is for driving the movable frame 12 together with the lens holder 11 located therein to move bi-directionally along an X-axis direction and a Y-axis direction, which usually is for moving the lens holder 11 together with the lens along the X-Y plane in order to compensate the biased position of the lens caused by shakings; that is, to perform OIS operations. Wherein, the X-axis, Y-axis and Z-axis are perpendicular with each other, while the Z-axis is also the optical path for the lens. In this first embodiment, the OIS module 14 comprises: at least a first stabilizing coil 141, at least a second stabilizing coil 142, at least a first stabilizing magnet 132, at least a second stabilizing magnet 133, and at least two position sensors 143. The first stabilizing coils 141 are furnished at two opposite sides of the first circuit board 17 and are coupled to the control unit 15. The second stabilizing coils 142 are furnished at the other two opposite sides of the first circuit board 17 and are perpendicular to the first stabilizing coils 141; in addition, the second stabilizing coils 142 are coupled to the control unit 15. In the present embodiment, the amount of both the first stabilizing coils 141 and the second stabilizing coils 142 is both three. The first stabilizing magnets 132 are mounted on the movable frame 12 and are corresponding to the first stabilizing coils 141, respectively. In the mean time, the second stabilizing magnets 133 are mounted on the movable frame 12 and are corresponding to the second stabilizing coils 142, respectively. In this first embodiment, the amount of both the first and second stabilizing magnets 132, 133 is two. In addition, the first and second stabilizing magnets 132, 133 are actually the same with the four driving magnets 132, 133 of the electromagnetic driving module 13; that means, the four magnets 132, 133 not only are used as the driving magnets in the electromagnetic driving module 13, but also are used as the stabilizing magnets in the OIS module 14 in the same time. However, in another embodiment not shown in figures, these driving magnets and stabilizing magnets can also be different magnets mounted on the same movable frame. The two position sensors 143 are mounted on the first circuit board 17 and are coupled to the control unit. The locations of these two position sensors 143 are respectively corresponding to and also near to the first stabilizing magnet 132 and the second stabilizing magnet 133. Such that, these two position sensors 143 can be used to detect the variations of the magnetic strength of the first stabilizing magnet 132 and the second stabilizing magnet 133, respectively, so as to detect and calculate the position or biased position of the movable frame 12 relative to the first circuit board 17 along the X-axis direction and the Y-axis direction. In this embodiment, the at least two position sensors 143 can also be Hall elements, but not necessarily be the 6-pin Hall element. These position sensors 143 can also be Hall elements with only four pins or other kinds of magnetic force detecting sensors.

The control unit 15 is furnished on the first circuit board 17 and is coupled with the stabilizing coils 141, 142 of the OIS module 14 and those position sensors 143. The control unit 15 can detect and control the operations of the OIS module 14, and can generate a control signal corresponding to the OIS operations of the OIS module 14. In other words, the control unit 15 can receive the output signals of the two position sensors 143 and then calculate the position or biased position of the movable frame 12 (together with the lens holder 11 and lens located therein) relative to the first circuit board 17 along the X-axis direction and the Y-axis direction; and then, the control unit 15 not only can generate control signals and electric currents to those stabilizing coils 141, 142 for driving the OIS module 14 to compensate the biased positions of the lens along the X-axis and Y-axis directions (that is, the OIS operations), but the control unit 15 also can generate a control signal based on the calculated position or biased position of the movable frame 12 relative to the first circuit board 17 along the X-axis direction and the Y-axis direction, and then send the control signal to the 6-pin Hall element 16.

In the present invention, the 6-pin Hall element 16 has six contact pins, in which, two pins are coupled to the electromagnetic driving module 13 for providing an electric current to the electromagnetic driving module 13 and also controlling the operations of the electromagnetic driving module 13, while the other four pins are coupled to the control unit 15 for receiving the control signals generated by the control unit 15. Such that, the 6-pin Hall element 16 can control the current providing to the electromagnetic driving module 13 according to the control signals generated by the control unit 15. That means, the control unit 15 not only can control the OIS module 14 to conduct the bi-directional OIS operations along the X-and-Y axes, but also can detect and receive the control signals of the OIS module 14 in order to calculate the current X-and-Y axial position (or biased position) of the movable frame 12 relative to the OIS module 14 (or first circuit board 17), so as to generate a control signal based on the calculated position (or biased position) of the movable frame 12 relative to the first circuit board 17 along the X-axis direction and the Y-axis direction, and then send the control signal to the 6-pin Hall element 16. Therefore, the 6-pin Hall element 16 not only can provide its own feedback control function for the Z-axial positions of the lens holder 11, but also can accept the control signal generated by the control unit 15 in order to obtain the current X-and-Y axial position (or biased position) of the movable frame 12; such that the 6-pin Hall element 16 can adjust the electric current providing to the electromagnetic driving module 13 according to the accepted control signal, so as to control the Z-axial auto-focusing operations of the electromagnetic driving module 13 of the auto-focus module. As a result, the feature of X-Y-Z tri-axis close-loop feedback controlling for electromagnetic lens driving device 1 is achieved. In the first embodiment, the 6-pin Hall element 16 can be the Hall element produced by Asahi. Kasei Microdevices Corp. with the Model No. AKM 7345 that can be purchased from the market, or can also be other kinds of Hall element with six pins available in the art, so as to provide to functions of acting as the position sensor along Z-axis direction and controlling and providing the driving current to the driving coils based on the control signal which in turn is corresponding to the X-and-Y axial positions of the movable frame.

In the first embodiment, the first circuit board 17 is a flexible printed circuit (FPC) board. The first circuit board 17 not only is furnished with the control unit 15, the stabilizing coils 141, 142 of the OIS module 14 and the position sensors 143, but also has a flat cable 171 extending out of the casing 20 of the electromagnetic lens driving device 1 for connecting to a connecting cable or a connecting socket (not shown in figures). In the present invention, the first circuit board 17 is connected on the bottom cover 21 and is a fixed member as the casing 20. To describe in a relative manner, the movable frame 12 is a movable member that can move relative to the first circuit board 17 bi-directionally along the X-axis and the Y-axis, while the lens holder 11 together with the lens therein is another movable member that can move relative to the movable frame 12 along the Z-axis direction.

Figure 3:
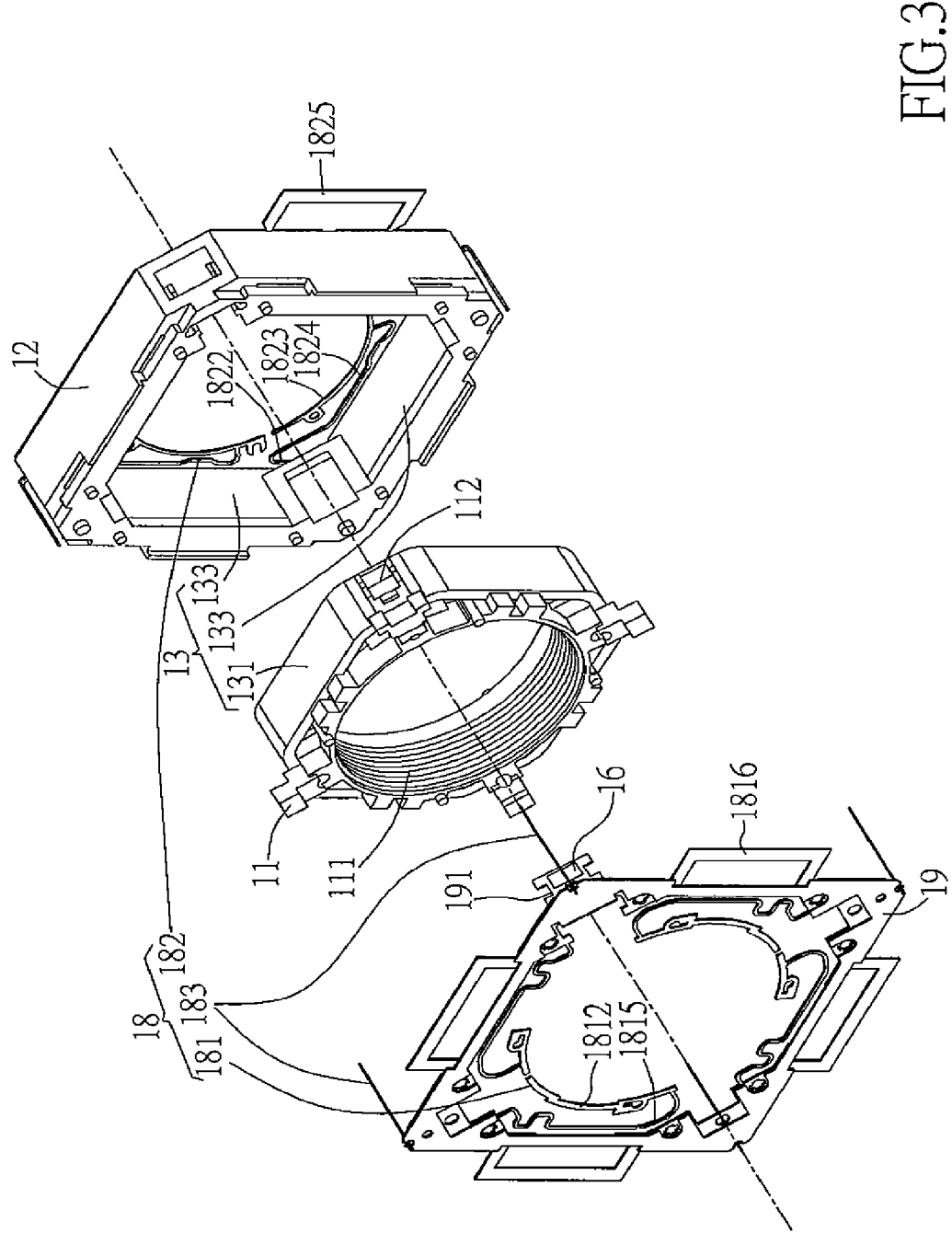
FIG. 3 is the front-side schematic exploded view of the electric coupling structure and the electromagnetic driving module of the electromagnetic lens driving device according to the first embodiment of the present invention.
Figure 4:
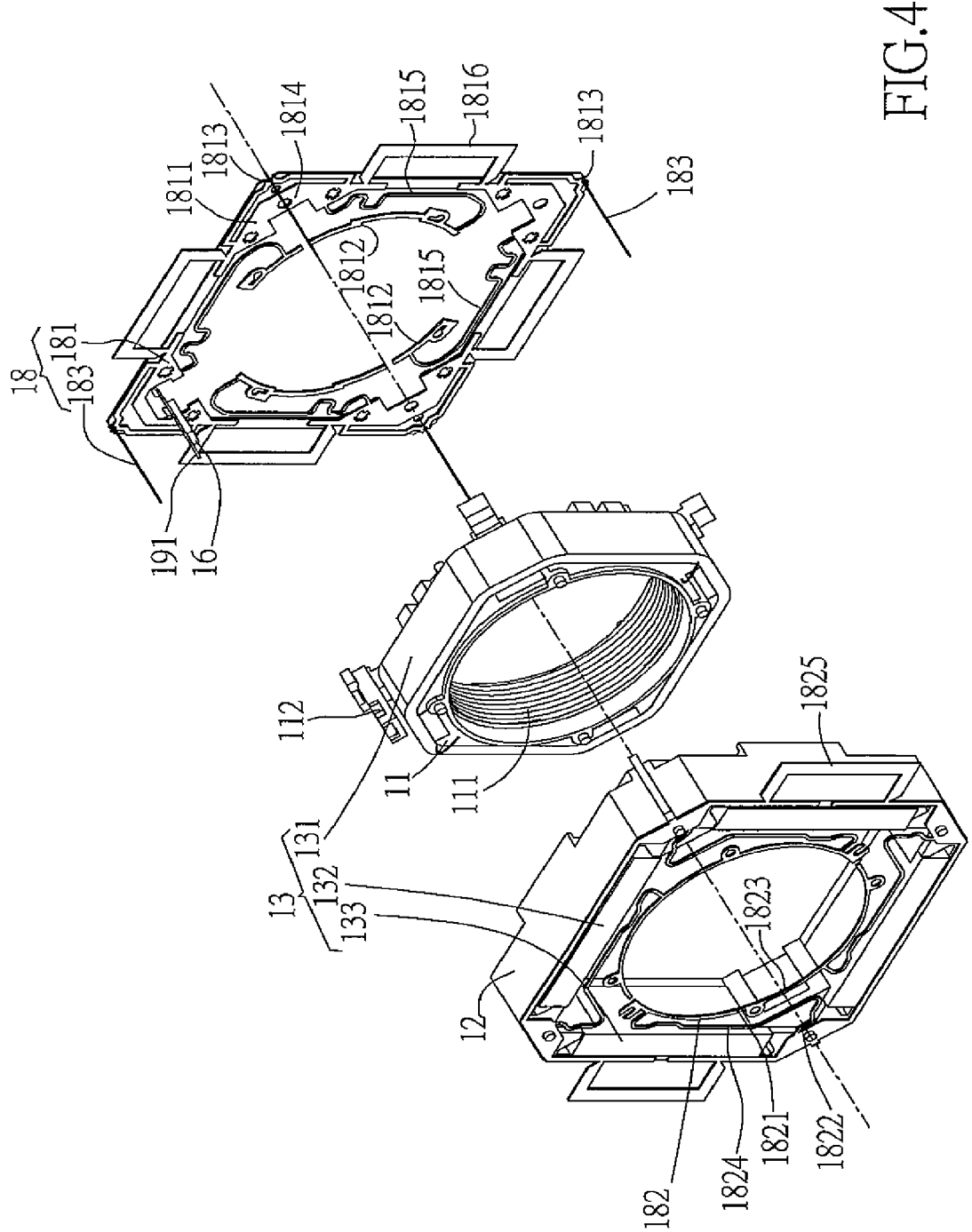
FIG. 4 is the rear-side schematic exploded view of the electric coupling structure and the electromagnetic driving module of the electromagnetic lens driving device according to the first embodiment of the present invention.

Please refer to FIG. 3 and FIG. 4, which respectively are the front-side and rear-side schematic exploded views of the electric coupling structure 18 and the electromagnetic driving module 13 of the electromagnetic lens driving device according to the first embodiment of the present invention. In the present invention, the 6-pin Hall element 16 is coupled with the electromagnetic driving module 13 and the control unit 15 by means of the electric coupling structure 18. In this first embodiment, the electric coupling structure 18 comprises a first spring plate 181 (also referred as the upper spring plate), a second spring plate 181 (also referred as the lower spring plate), and at least four suspension wires 183. The first spring plate 181 is located at an upper side of the lens holder 11 along the Z-axis direction, and comprises four individual and separated first spring member 1811. Each one of the first spring members 1811 comprises a first inner rim 1812 for flexibly retaining a top position of the lens holder 11 along the Z-axis direction and a first contact 1813 which is connected with one suspension wire 183. Each one of the suspension wires 183 extends from the first spring members 1811 toward the first circuit board 17 and couples to the control unit 15. The 6-pin Hall element 16 is coupled with the four first spring members 1811 of the first spring plate 181 and the electromagnetic driving module 13, and can receive a control signal from the control unit 15 in order to control and adjust the electric current provided by the 6-pin Hall element 16 to the electromagnetic driving module 13. As shown in FIG. 3 and FIG. 4, both the first spring plate 181 and the second spring plate 182 are in the form of hollowed out thin metal plate. Wherein, each one of the first spring members 1811 of first spring plate 181 comprises: a first outer rim 1814 connected to the movable frame 12, a first inner rim 1812 connected to the lens holder 11, at least one first inner string 1815 extending and connecting between the first outer rim 1814 and the first inner rim 1812, and a first contact 1813 located at the first outer rim 1814. Each one of the suspension wires 183 has its one end thereof being correspondingly connected and soldered to one of the first contacts 1813.

The second spring plate 182 is located at a lower side of the lens holder 11 along the Z-axis direction opposite to the first spring plate 181, and comprises at least two individual and separated second spring member 1821. Each one of the second spring members 1821 comprises: a second outer rim 1822 connected to the movable frame 12, a second inner rim 1823 for flexibly retaining a bottom position of the lens holder 11 along the Z-axis direction, at least one second inner string 824 extending and connecting between the second outer rim 1822 and the second inner rim 823, and a second contact (not shown in FIGS. 3 and 4) located at the second outer rim 1822. Each one of the suspension wires 183 has its one end thereof being correspondingly connected and soldered to one of the first contacts 1813. Wherein, each one of the second inner rims 1823 of the second spring members 1821 is coupled with the driving coil 131 of the electromagnetic driving module 13, while the second contact of the second spring member 1821 is electrically coupled to the second circuit board 19 and then further coupled with one of the six pins of the 6-pin Hall element 16.

It is worth to mention that, as shown in FIG. 3 and FIG. 4, although there are a plurality of first connecting parts 1816 being formed between the first spring members 181, while a plurality of second connecting parts 1825 are further formed between the second spring members 182; however, the function and purpose of these first and second connecting parts 1816, 1825 are merely for convenient production and assembly only. Once the first spring plate 181 and the second spring plate 182 are assembled onto the electromagnetic lens driving device 1, these first and second connecting parts 1816, 1825 will be broken, separated and discarded, and no longer belong to the components of the electromagnetic lens driving device 1 of the invention. After then, those first spring members 1811 will be separated from each other and become individual members, while those second spring members 1821 will also be separated from each other and also become individual members.

In the present invention, the outer rim of the second circuit board 19 and the outer rim of the first spring plate 181 are both fixed to a top surface of the movable frame 12, and thus are movable together with the movable frame 12 horizontally. The 6-pin Hall element 16 if mounted on a bent part 191 of the second circuit board 19; and in addition, a sensing magnet 112 for Z-axis position is furnished on the lens holder 11 at a location corresponding to and nearby the 6-pin Hall element 16. Moreover, the end of each one of the suspension wires 183 that is soldered to the first contact 1813 is also coupled to the second circuit board 19, and thus is further coupled to one of the pins of the 6-pin Hall element 16 by means of the second circuit board 19. The other end of each one of the suspension wires 183 is connected to the first circuit board 17 and is further coupled with the control unit 15.

Figure 5:
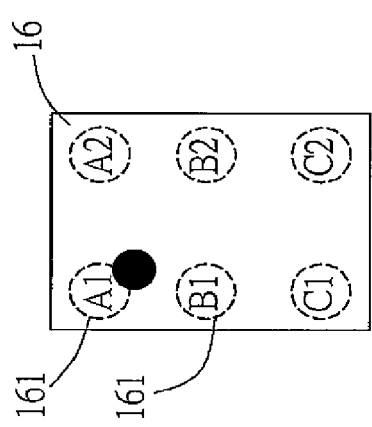
FIG. 5 is a schematic view of the six pins of the 6-pin Hall element of the electromagnetic lens driving device of the present invention.

Please refer to FIG. 5 which is a schematic view of the six pins of the 6-pin Hall element of the electromagnetic lens driving device of the present invention. Taking the example of the 6-pin Hall element of Model No. AKM 7345 produced by Asahi Kasei. Microdevices Corp., its six pins 161 can be numbered as A1, A2, B1, B2, C1 and C2, respectively, and the feature of each pin is shown in the following Table One.

TABLE ONE descriptions of pins of AKM 7345 Hall element

| Pin No. | Name | Type | I/O | Description | Notes |
| --- | --- | --- | --- | --- | --- |
| A1 | VDD | PWR | — | Input Power Supply | Power pin |
| B1 | SDA | D | I/O | Data | Digital pin |
| C1 | OUT1 | A | O | Driver output 1 | Analog pin |
| C2 | OUT2 | A | O | Driver output 2 | Analog pin |
| B2 | SCL | D | I | Clock | Digital pin |
| A2 | VSS | GND | — | Ground | Ground pin |

Wherein, pin A1 is VDD (pin for input power) whose function is to input power supply of 2.65V~3.6V (Volt) for driving the 6-pin Hall element 16. Pin A2 is VSS whose function is ground. Pin B1 is SDA whose function is to input and output digital data signals. Pin B1 is SCL whose function is to input clock signals. Pins C1 and C2 are for outputting driving current of 79 mA~142 mA (120 mA preferred) to the driving coil 131 of electromagnetic driving module 13 in order to perform the auto-focusing and/or zooming operations.

Figure 7:
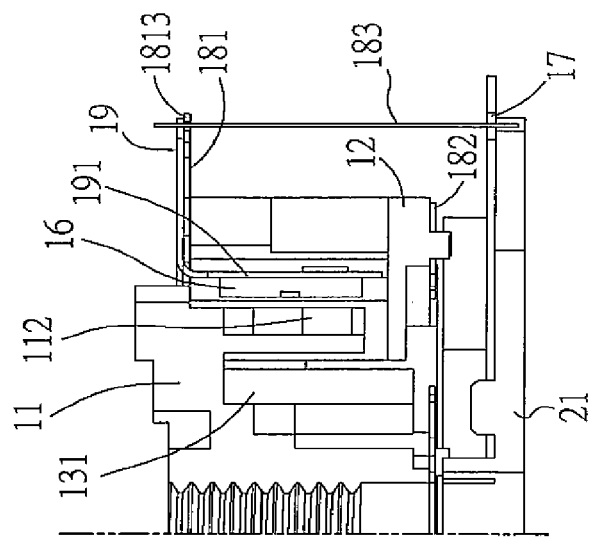
FIG. 7 is the partial cross-sectional view of the detailed positions of the suspension wires of the electromagnetic lens driving device according to the present invention's first embodiment.
Figure 6:
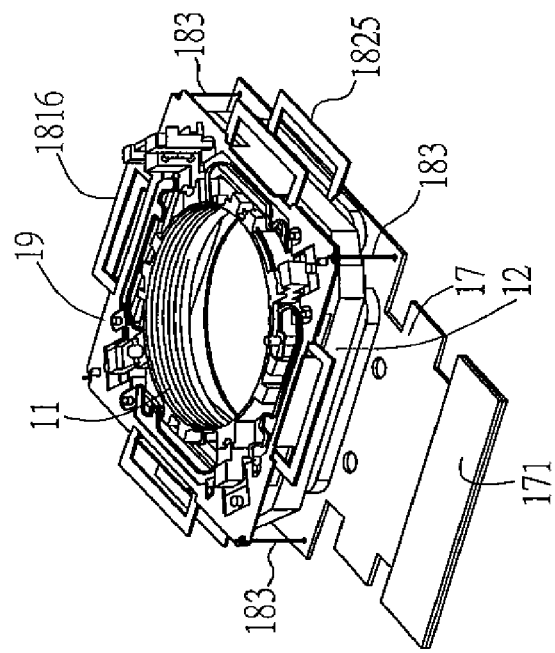
FIG. 6 is the perspective assembled view of the detailed positions of the suspension wires of the electromagnetic lens driving device according to the present invention's first embodiment.

Please refer to FIG. 6 and FIG. 7, which respectively are the perspective assembled view and the partial cross-sectional view of the detailed positions of the suspension wires 183 of the electromagnetic lens driving device 1 according to the present invention's first embodiment. As shown in FIG. 6 and FIG. 7, in the first embodiment of the invention, each one of the suspension wire 183 has its one end (upper end) connects to a corresponding first contact 1813 of the first spring member 1811, and couples to the second circuit board 19 via the first spring member 1811, and thus further couples to one of the pins A1, A2, B1 and B2 of the 6-pin Hall element 16 furnished on the second circuit board 19. Another end (lower end) of each one of the suspension wire 183 is connected to one of the four corners of the bottom cover 21 and is electric coupled to the control 15 furnished on the first circuit board 17. Because the lower end of each suspension wire 183 is fixed to the bottom cover 21 which is a fixed component, and the upper end of each suspension wire 183 is fixed to the first contact 1813 of the first outer rim 1814 of the first spring member 1811, and the first outer rim 1814 of each first spring member 1811 is connected to the movable frame 12, and the first inner rim 1812 of each first spring member 1811 is connected to the lens holder 22; therefore, these suspension wires 183 substantially lift and suspend the movable frame 13 together with the lens holder 11 above the first circuit board 17. Such that, the movable frame 12 can only bi-directionally move relative to the first circuit board 17 along the X-axis and the Y-axis in a restricted manner, but almost cannot move along the Z-axis direction.

In the present invention, the second contact of each one of the second spring members 1821 is coupled to the second circuit board 19 by means of one of the following structure: bending a thin elongated extending part extended from the second contact toward the second circuit so as to let the upper end of the extending part connect to the second circuit board 19, or soldering a connecting wire at the second contact and let the upper end of the connecting wire connect to the second circuit board 19. These structures will be described in detail below.

Please refer to FIG. 8 and FIG. 9, which respectively are the perspective assembled view and the partial cross-sectional view of the detailed positions of the second spring plate 182 of the electromagnetic lens driving device 1 according to the present invention's first embodiment. As shown in FIG. 8 and FIG. 9, in the first embodiment of the invention, the second spring plate 182 comprises two independent and separated second spring members 1821. Each one of the second spring members 1821 includes a thin elongated extending part 1827 which is extended from the second contact 1826 and id bent toward the second circuit board 19 in such a manner that, the upper end of the extending part 1827 is contacted and soldered with the second circuit board 19, and thus further coupled to one of the pins C1 and C2 of the 6-pin Hall element 16.

Figure 10:
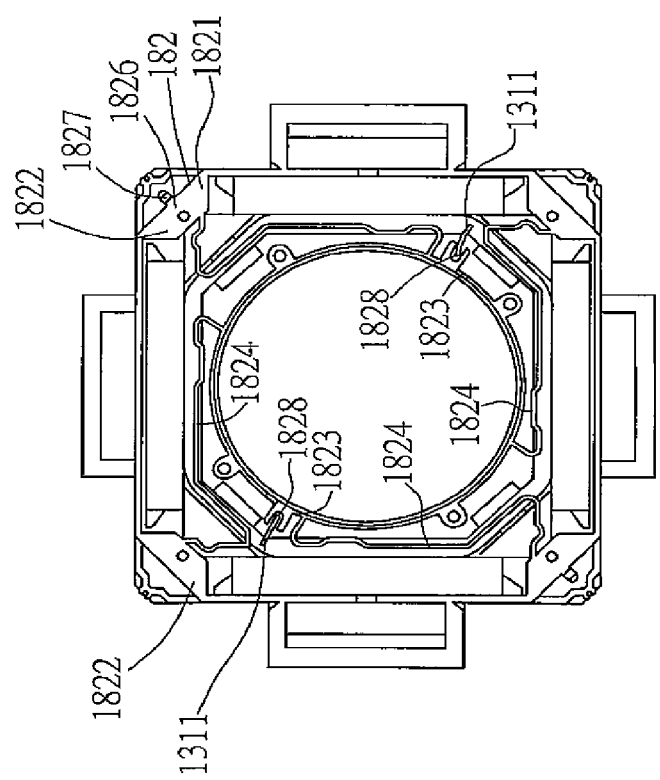
FIG. 10 is a schematic view showing a connecting way of the second spring plate and the driving coil of the electromagnetic driving module of the electromagnetic lens driving device according to the present invention's first embodiment.

As shown in FIG. 10 which is a schematic view showing a connecting way of the second spring plate 182 and the driving coil 131 of the electromagnetic driving module 13 of the electromagnetic lens driving device 1 according to the present invention's first embodiment. The second spring plate 182 comprises two independent and separated second spring members 1821. Each one of the second spring members 1821 includes a soldering point 1828 at its second inner rim 1823. Each one of the two soldering point 1828 is soldered with an end of the wire 1311 of the driving coil 131 of the electromagnetic driving module 13. That means, the second inner rim 1823 of each second spring member 1821 is electric coupled with the driving coil 131 of the electromagnetic driving module 13 by means of the wire 1311 soldered at its soldering point 1828. In addition, the second contact 1826 of each second spring member 1821 is coupled to the second circuit board 19 via the extending part 1827, and thus is further coupled with one of the pins C1 and C2 of the 6-pin Hall element 16. Thereby, the analog current signals output from the pins C1 and C2 of the 6-pin Hall element 16 can be used to drive the driving coil 131 of the electromagnetic driving module 13 in order to let the lens holder 11 move relative to the movable frame 12 for performing the auto-focusing and/or zooming operations along the Z-axis direction.

Figure 12A:
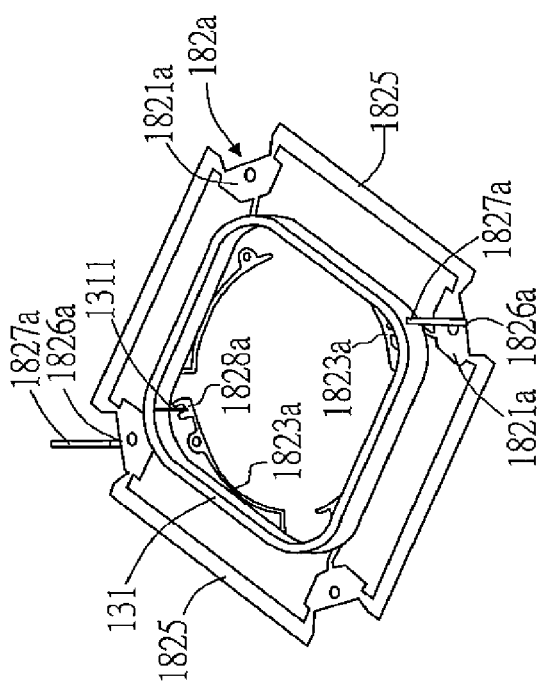
FIGS. 12A to 12C are respectively the schematic views of three different embodiments of the ways to electrically conduct the driving coil of the electromagnetic driving module of the electromagnetic lens driving device of the invention.
Figure 12B:
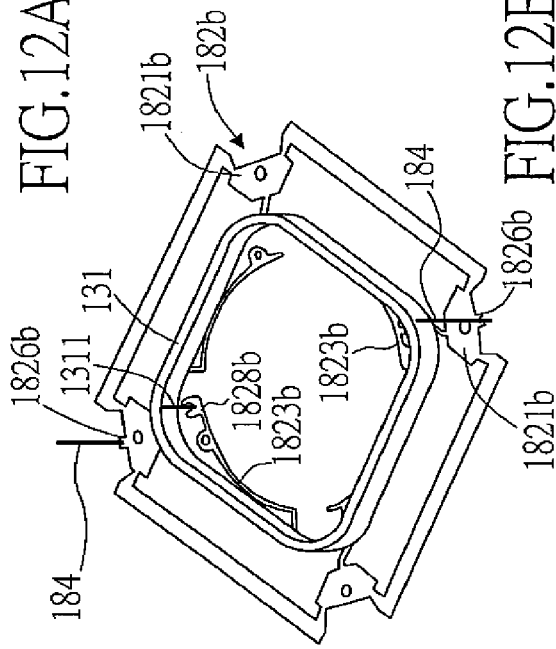
Figure 12C:
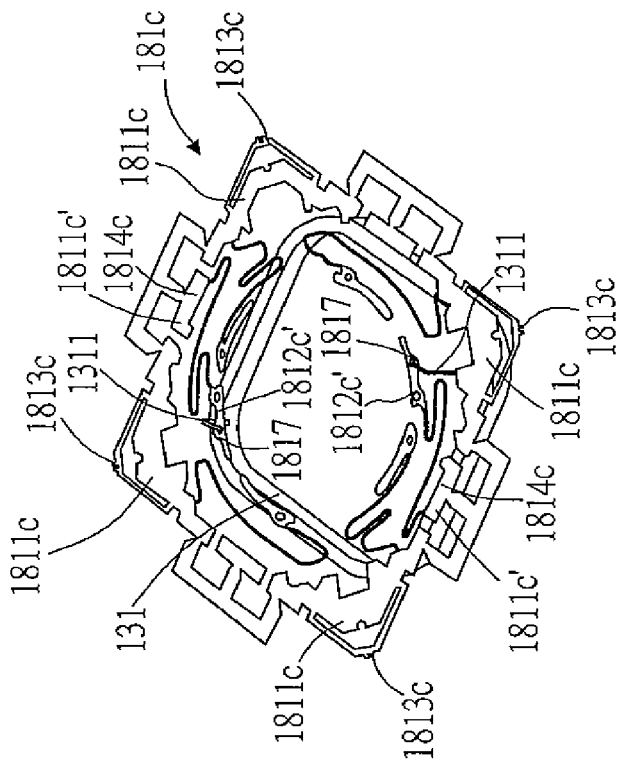
Figure 13A:
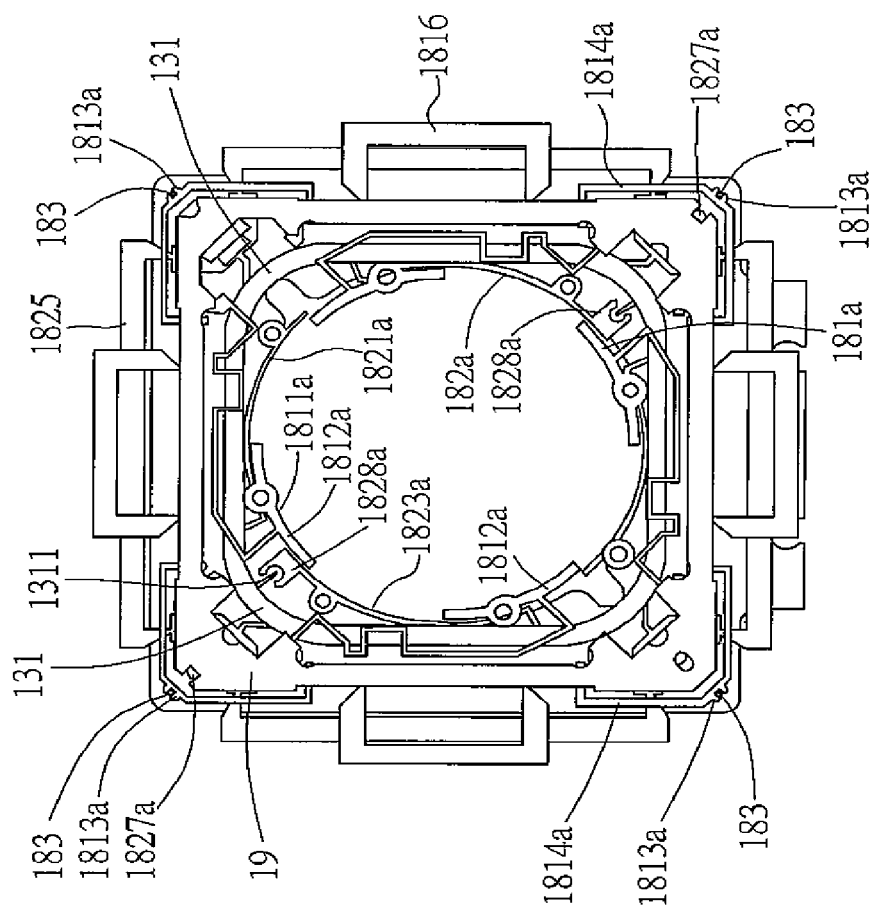
FIG. 13A and FIG. 13B are respectively the top view and schematic perspective view of the embodiment shown in FIG. 12A.
Figure 13B:
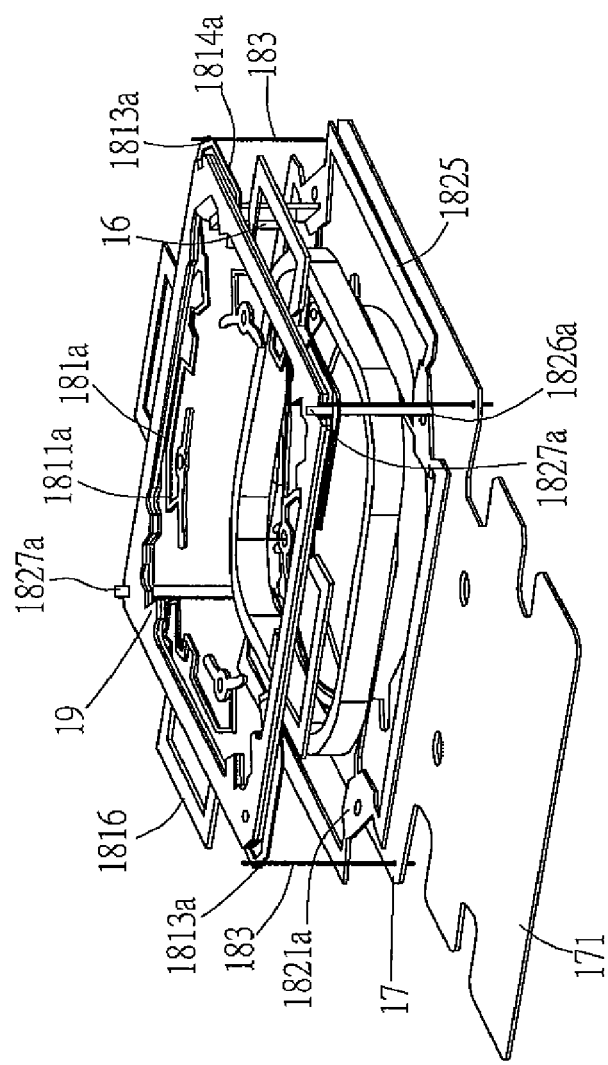
Figure 14A:
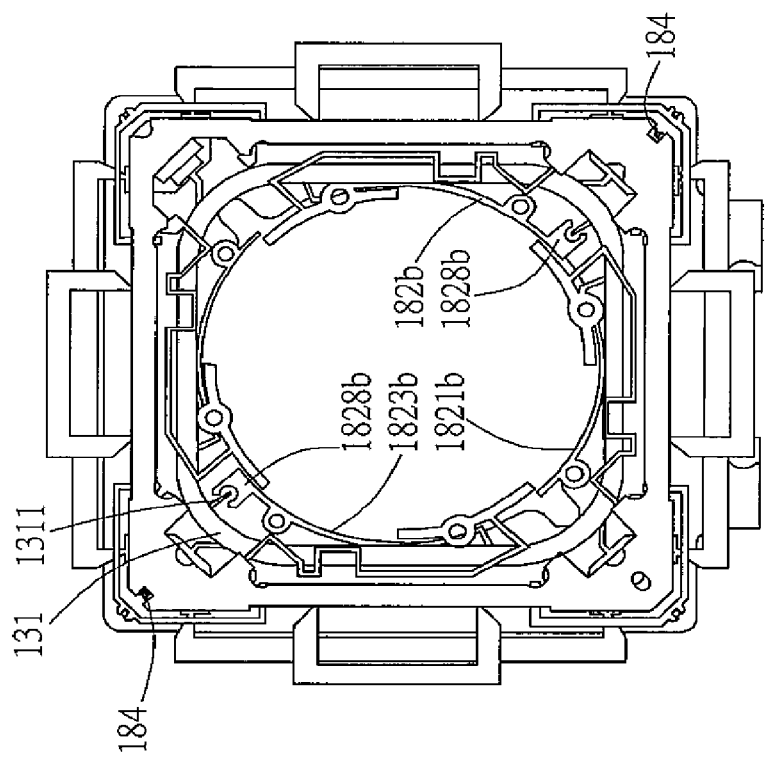
FIG. 14A and FIG. 14B are respectively the top view and schematic perspective view of the embodiment shown in FIG. 12B.
Figure 14B:
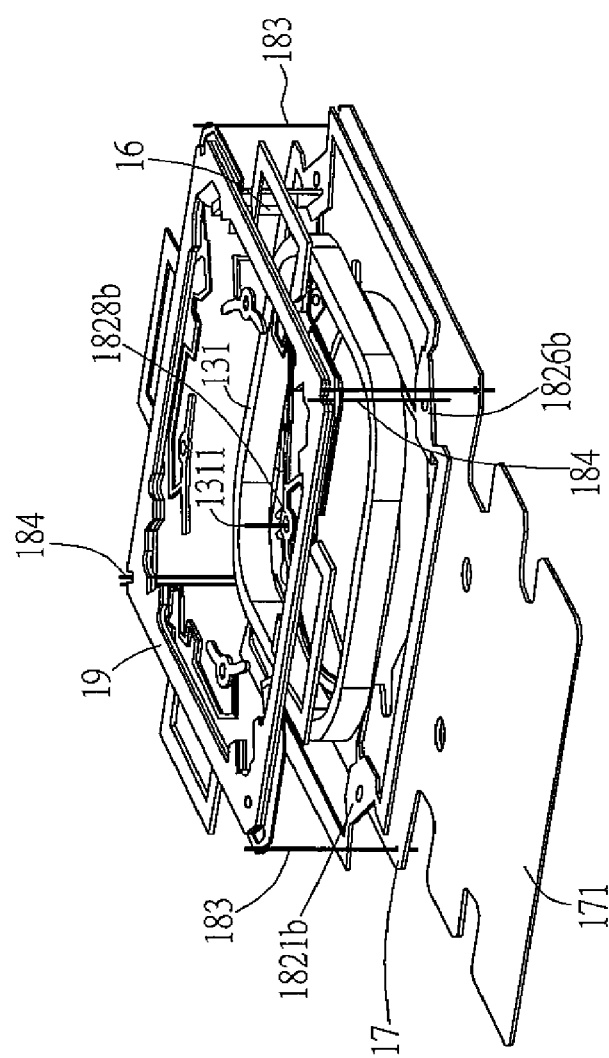
Figure 15A:
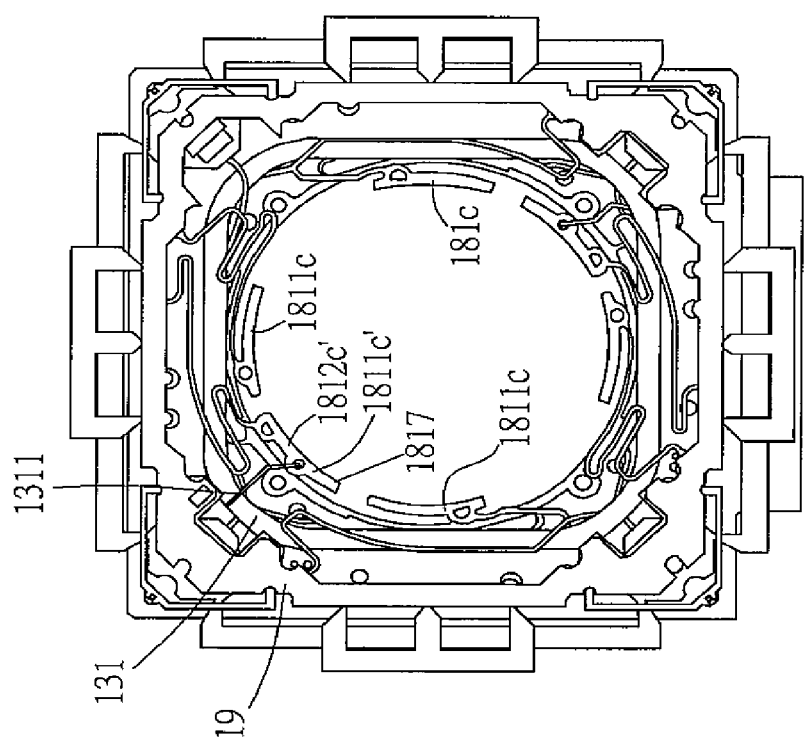
FIG. 15A and FIG. 15B are respectively the top view and schematic perspective view of the embodiment shown in FIG. 12C.
Figure 15B:
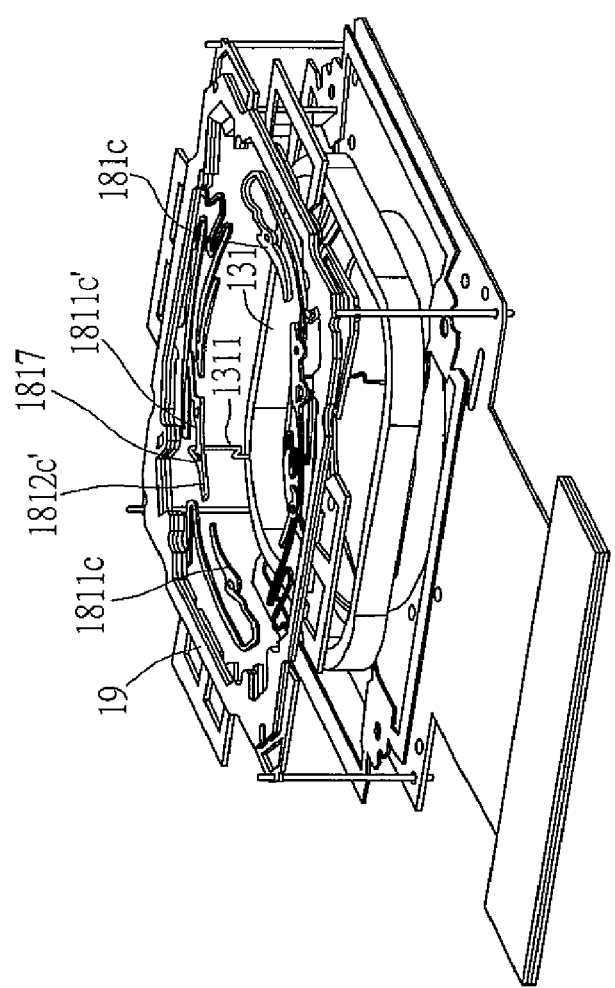

In the present invention, there are several ways to electrically conduct the driving coil of the electromagnetic driving module. For example, FIGS. 12A to 12C are respectively the schematic views of three different embodiments of the ways to electrically conduct the driving coil of the electromagnetic driving module of the electromagnetic lens driving device of the invention. In addition, FIG. 13A and FIG. 13B are respectively the top view and schematic perspective view of the embodiment shown in FIG. 12A. FIG. 14A and FIG. 14B are respectively the top view and schematic perspective view of the embodiment shown in FIG. 12B. FIG. 15A and FIG. 15B are respectively the top view and schematic perspective view of the embodiment shown in FIG. 12C.

Please refer to FIG. 12A, FIG. 13A and FIG. 13B, which illustrate an embodiment of the way to electrically conduct the driving coil of the electromagnetic driving module of the first embodiment as shown in FIGS. 8-10. That is, the second spring plate 182a includes four independent and separated second spring members 1821a. Among them, there are two of the second spring members 1821a that, each one of these two second spring members 1821a includes a soldering point 1828a at its second inner rim 1823a. Each one of the two soldering point 1828a is soldered with an end of the wire 1311 of the driving coil 131 of the electromagnetic driving module 13. That means, the second inner rim 1823a of each of these two second spring member 1821a is electric coupled with the driving coil 131 of the electromagnetic driving module 13 by means of the wire 1311 soldered at its soldering point 1828a. In addition, the second contact 1826a of each of these two second spring members 1821a is coupled to the second circuit board 19 via an extending part 1827a extending from the second contact 1826a toward the second circuit board 19, and thus is further coupled with one of the pins C1 and C2 of the 6-pin Hall element 16. In addition, similar to the electromagnetic driving module 13 of the first embodiment shown in FIGS. 8-10, the first spring plate 181a shown in FIG. 12A, FIG. 13A and FIG. 13B also includes at least four first spring members 1811a. Each one of these four first spring members 1811a includes a first inner rim 1812a for flexibly retaining a top position of the lens holder 11 along the Z-axis direction and a first contact 1813a which is connected with one suspension wire 183. Each one of the suspension wires 183 extends from the first spring members 1811a toward the first circuit board 17 and couples to the control unit 15. The first outer rim 1814a of each one of these four first spring members 1811a is coupled to the second circuit board 19 and then is further coupled to one of the pins A1, A2, B1 and B2 of the 6-pin Hall element 16 respectively. Thereby, the four pins A1, A2, B1 and B2 of the 6-pin Hall element 16 are coupled to the control unit 15 by means of the four first spring members of the first spring plate and the four suspension wires, while the other two pins C1 and C2 of the 6-pin Hall element 16 are coupled to the driving coil 131 of the electromagnetic driving module 13 by means of the bent extending parts 1827a and the second inner rims 1823a of the two second spring members 1821a and the second circuit board 19. By means of such novel electric coupling structure, the control 15 can detect the signals of the OIS module 14 to obtain the X-and-Y axial positions of the movable frame 12 relative to the first circuit board 17, and then generates a control signal according to the X-and-Y axial positions of the movable frame 12, and then sends this control signal to the 6-pin Hall element 16. Therefore, the 6-pin Hall element 16 not only can provide its own feedback controlling function according to the Z-axial position of lens, but also can accept the control signal from the control unit 15 and then providing the current for driving the auto-focus module 13 based on the control signal received from the control unit 15, so as to achieve the goal of tri-axis close-loop feedback controlling for the electromagnetic driving module 13.

Please refer to the embodiment shown in FIG. 12B, FIG. 14A and FIG. 14B, wherein, the second spring plate 182b also includes two or four independent and separated second spring members 1821b. In which, the second inner rim 1823b of each one of two of the second spring members 1821b is formed with a soldering point 1828b. Each soldering point 1828b is soldered with one end of the wires 1311 of the driving coil 131 of the electromagnetic driving module 13. However, the second contact 1826b of each one of two of the second spring members 1821b is soldered with a lower end of a connecting wire 184. The other end (upper end) of each connecting wire 184 is connected to the second circuit board 19, and is further coupled to one of the pins C1 and C2 of the 6-pin Hall element 16. Since the electrical conduction method between the pins A1, A2, B1 and B2 of the 6-pin Hall element 16 and the control unit 15 is exactly the same as the embodiment previously illustrated in FIG. 12A, FIG. 13A and FIG. 13B, and thus will not be described in detailed here.

Please refer to the embodiment shown in FIG. 12C, FIG. 14A and FIG. 14B, which does not rely on the second spring plate to electric conduct the driving coil of the electromagnetic driving module. In contrast, as shown in FIG. 12C, the first spring plate 181c includes at least six independent and separated first spring members 1811c, 1811c'. Among these six first spring members 1811c, 1811c', there are four first spring members 1811c that each of these four first spring members 1811c includes the first contact 1813c which is coupled with the control unit 15 by means of the suspension wire 183 connected to the first contact 1813c. The other two first spring members 1811c' do not connect to the suspension wires 183, in addition, each one of these two first spring members 1811c' includes a soldering point 1817 located on the first inner rim 1812c'. The soldering point 1817 of each one of these two first spring members 1811c' is soldered with one end of the wires 1311 of the driving coil 131, and thus is coupled with the electromagnetic driving module 13. Wherein, the first inner rims 1812c' of the two first spring members 1811c' are coupled with two ends of the driving coil 131 of the electromagnetic driving module 13, in the mean time, either the first contact or the first outer rim 1814c of each one of the two first spring members 1811c' is coupled to the second circuit board 19 and is further coupled to one of the pins C1 and C2 of the 6-pin Hall element 16, so as to provide a current to the electromagnetic driving module 13 for controlling its operations. Since the electrical conduction method between the pins A1, A2, B1 and B2 of the 6-pin Hall element 16 and the control unit 15 is exactly the same as the embodiment previously illustrated in FIG. 12A, FIG. 13A and FIG. 13B, and thus will not be described in detailed here.

The other embodiments of the present invention described below generally comprise the same or similar components, structures and features as the first embodiment illustrated above, and thus the same numerals and names will be assigned to the same or similar components, only that an additional alphabet will be added after the numeral for distinguishing the different embodiments, and no detailed descriptions will be provided for these same or similar components.

Figure 17:
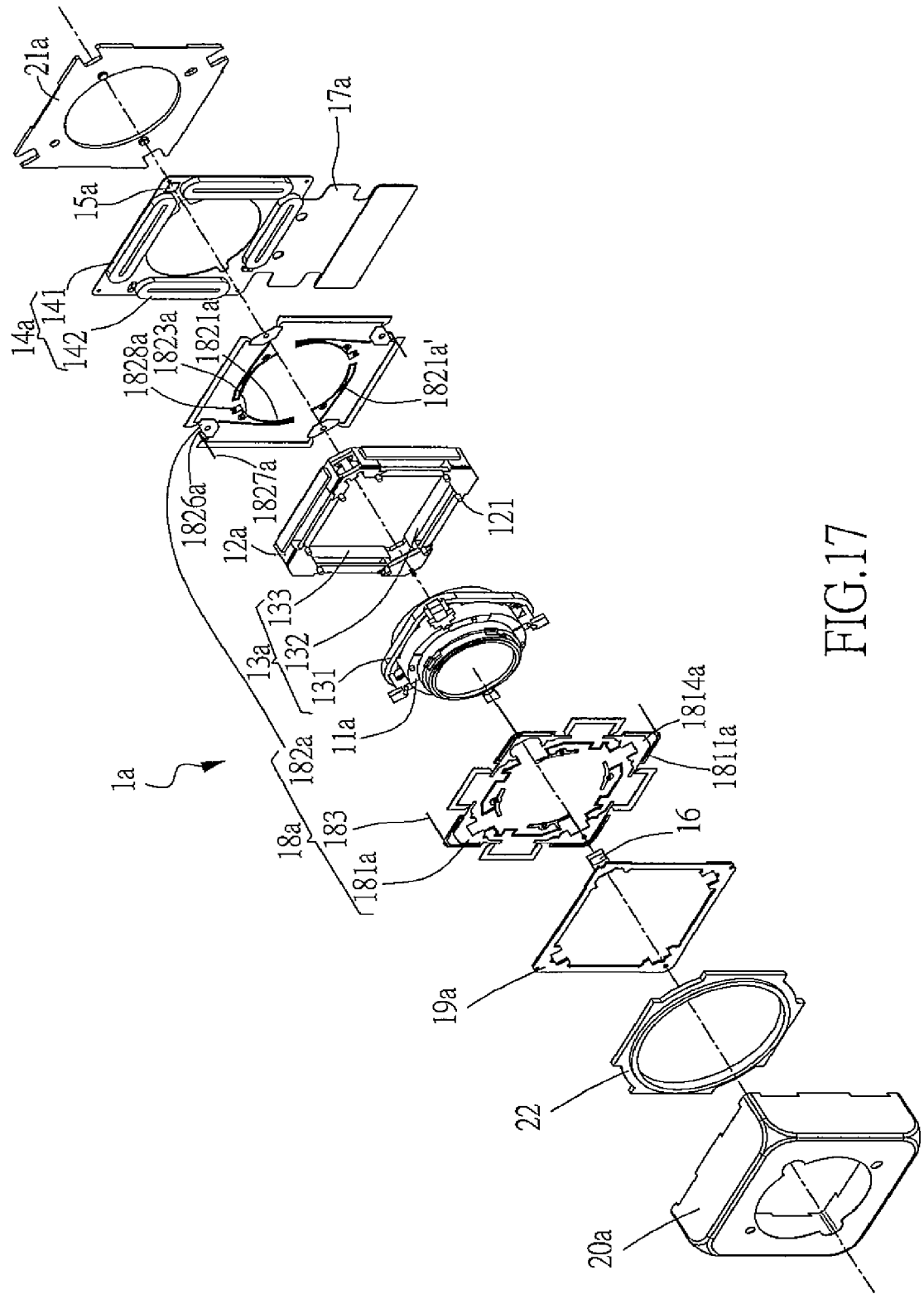
FIG. 17 is a schematic perspective view of the tri-axis close-loop feedback controlling module for the electromagnetic lens driving device according to a second embodiment of the present invention.

FIG. 17 is a schematic perspective view of the tri-axis close-loop feedback controlling module for the electromagnetic lens driving device according to a second embodiment of the present invention. According to this second embodiment, the electromagnetic lens driving device 1a comprises: a lens holder 11a, a moveable frame 12a, an electromagnetic driving module 13a, an OIS module 14a, a control unit 15a, a 6-pin Hall element 16, a first circuit board 17a, an electric coupling structure 18a, a second circuit board 19a, a casing 20a, a bottom cover 21a and a top cover 22. Wherein, the lens holder 11a, moveable frame 12a, electromagnetic driving module 13a, OIS module 14a, control unit 15a, 6-pin Hall element 16, first circuit board 17a, second circuit board 19a, casing 20a and bottom cover 21a have similar structures and features of which previously illustrated in the first embodiment shown in FIG. 1 and FIG. 16, and thus no detailed descriptions will be provided for these similar components. The differences between the electromagnetic lens driving device 1a of this second embodiment and the first embodiment are described below.

The top cover 22 is located between the casing 20a and the second circuit board 19a, and can clamp and fix the second circuit board 19a and the first outer rim 1814a of each first spring member 1811a of the first spring plate 181a to the protrusions 121 formed on the upper surface of the movable frame 12a. In the mean time, the top cover 22 can also prevent the lens holder 11a from dropping out of the movable frame 12a when moving along the Z-axis direction.

The electric coupling structure 18a of this second embodiment shown in FIG. 17 also comprises a first spring plate 181a (also referred as upper spring plate), a second spring plate 182a (also referred as lower spring plate) and four suspension wires 183. However, in this second embodiment, the second spring plate 182a comprises four independent and separated second spring members 1821a, 1821a'. Wherein, two of the second spring members 1821a are formed with a thin elongated extending part 1827a extending from the second contact 1826a and a soldering point 1828a located at the second inner rim 1823a. The extending part 1827a is bent toward the second circuit board 19 such that the end of the extending part 1827a can connect to the second circuit board 19. The soldering points 1828a are soldered with two ends of the wires of the driving coil 131 of the electromagnetic driving module 13. The other two second spring members 1821a' of the second spring plate 182a do not have the extending parts nor the soldering points. The electric coupling structure 18a of this second embodiment shown in FIG. 17 is corresponding to the embodiment shown in FIG. 12A, FIG. 13A and FIG. 13B.

Figure 18:
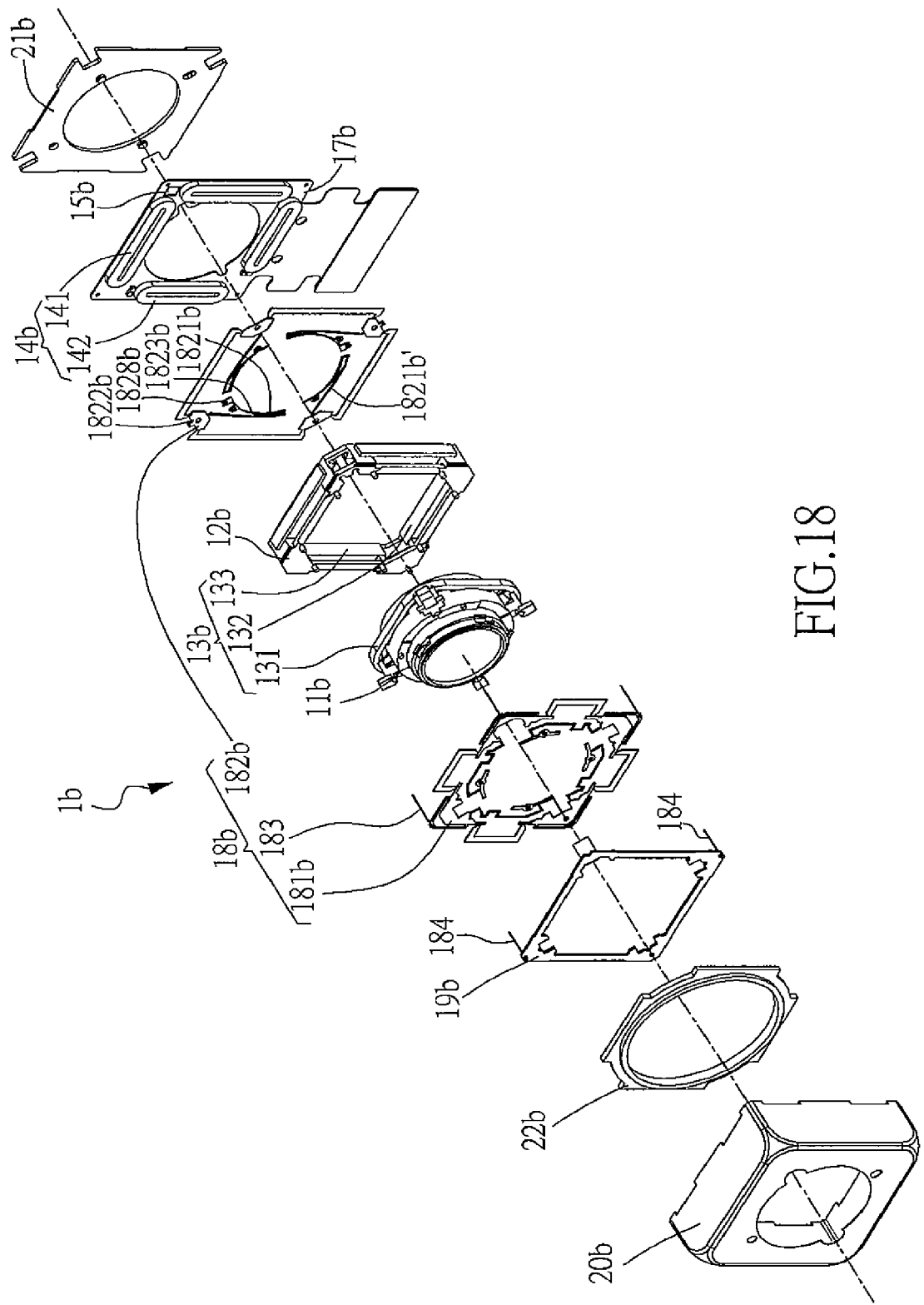
FIG. 18 is a schematic perspective view of the tri-axis close-loop feedback controlling module for the electromagnetic lens driving device according to a third embodiment of the present invention.

FIG. 18 is a schematic perspective view of the tri-axis close-loop feedback controlling module for the electromagnetic lens driving device 1b according to a third embodiment of the present invention. According to this third embodiment, the electromagnetic lens driving device 1b comprises: a lens holder 11b, a moveable frame 12b, an electromagnetic driving module 13b, an OIS module 14b, a control unit 15b, a 6-pin Hall element 16, a first circuit board 17b, an electric coupling structure 18b a second circuit board 19b, a casing 20b, a bottom cover 21b and a top cover 22b. Wherein, the lens holder 11b, moveable frame 12b, electromagnetic driving module 13b, OIS module 14b, control unit 15b, 6-pin Hall element 16, first circuit board 17b, second circuit board 19b, casing 20b, bottom cover 21b and top cover 22b have similar structures and features of which previously illustrated in the second embodiment shown in FIG. 17, and thus no detailed descriptions will be provided for these similar components. The differences between the electromagnetic lens driving device 1b of this third embodiment and the second embodiment are described below.

According to the electromagnetic lens driving device 1b of this third embodiment shown in FIG. 18, although the second spring plate 182b comprises four independent and separated second spring members 1821b, 1821b', however, two of the second spring members 1821b are formed with the soldering points 1828b on their second inner rims 1823b, but there is no extending part being formed on the second spring members 1821b. In contrast, two connecting wires 184 are connected between the second outer rims 1822b of the two second spring members 1821b having the soldering points 1828b and the second circuit board 19. Each soldering point 1828b is soldered with an end of the wires of the driving coil 131 of the electromagnetic driving module 13b. The other two spring members 1821b' do not have any connecting wire nor soldering point. The electric coupling structure 18b of this third embodiment shown in FIG. 18 is corresponding to the embodiment shown in FIG. 12B, FIG. 14A and FIG. 14B.

Figure 19:
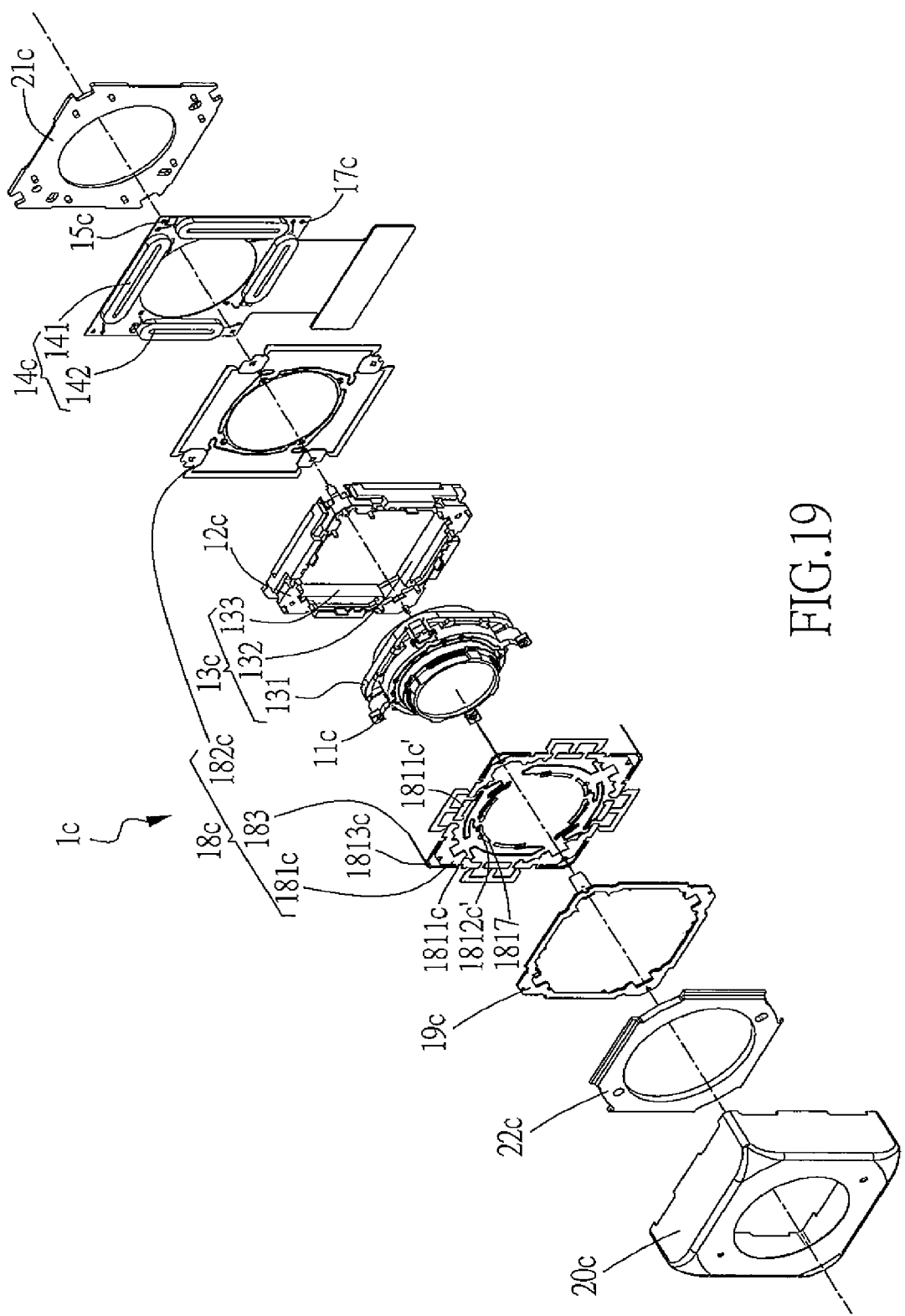
FIG. 19 is a schematic perspective view of the tri-axis close-loop feedback controlling module for the electromagnetic lens driving device according to a fourth embodiment of the present invention.

FIG. 19 is a schematic perspective view of the tri-axis close-loop feedback controlling module for the electromagnetic lens driving device 1c according to a fourth embodiment of the present invention. According to this fourth embodiment, the electromagnetic lens driving device 1c comprises: a lens holder 11c, a moveable frame 12c, an electromagnetic driving module 13c, an OIS module 14c, a control unit 15c, a 6-pin Hall element 16, a first circuit board 17c, an electric coupling structure 18c a second circuit board 19c, a casing 20c, a bottom cover 21c and a top cover 22c. Wherein, the lens holder 11c, moveable frame 12c, electromagnetic driving module 13c, OIS module 14c, control unit 15c, 6-pin Hall element 16, first circuit board 17c, second circuit board 19c, casing 20c, bottom cover 21c and top cover 22c have similar structures and features of which previously illustrated in the second embodiment shown in FIG. 17, and thus no detailed descriptions will be provided for these similar components. The differences between the electromagnetic lens driving device 1c of this fourth embodiment and the second embodiment are described below.

According to the electromagnetic lens driving device 1c of this fourth embodiment shown in FIG. 19, the electric coupling structure 18c does not rely on the second spring plate 182c to electric conduct the driving coil 131 of the electromagnetic driving module 13c. In contrast, as shown in FIG. 19, the first spring plate 181c includes at least six independent and separated first spring members 1811c, 1811c'. Among these six first spring members 1811c, 1811c', there are four first spring members 1811c that each of these four first spring members 1811c includes the first contact 1813c which is coupled with the control unit 15 by means of the suspension wire 183. The other two first spring members 1811c' do not connect to the suspension wires 183, in addition, each one of these two first spring members 1811c' includes a soldering point 1817 located on the first inner rim 1812c'. The soldering point 1817 of each one of these two first spring members 1811c' is soldered with one end of the wires of the driving coil 131, and thus is coupled with the electromagnetic driving module 13. The electric coupling structure 18c of this fourth embodiment shown in FIG. 19 is corresponding to the embodiment shown in FIG. 12C, FIG. 15A and FIG. 15B.

To sum up, the tri-axis close-loop feedback controlling module for electromagnetic lens driving device of the invention utilizes a 6-pin. Hall element in the second circuit board fixed to the movable frame (lens module). The movable frame is suspended above a substrate (first circuit board). The movable frame is furnished with a lens holder for holding a lens therein which is movable along the X-axis direction. The lens holder is flexibly suspended within an inner compartment of the movable frame by means of an upper spring plate and a lower spring plate fixed on two ends of the lens holder. The rim of the movable frame is mounted with at least one driving magnet. The outer rim of the lens holder is wound with a driving coil corresponding to the driving magnet. By driving the driving coil to move the lens holder together with the lens thereinside along the Z-axis (optical path), the functions of auto-focusing and/or zooming are achieved. In an embodiment of the novel electric coupling structure of the invention, two ends of the driving coil are coupled to the two pins (C1, C2) of the Hall element by means of the two upward bent conduct ends of the lower spring plate. In the mean time, by electric connecting the four contacts of the upper spring plate with the other four pins (A1, A2, B1, B2) of the Hall element, and using the four suspension wires (located at the four corners of the upper spring plate) of a suspension mechanism to electrically connecting the other four pins with the substrate (first circuit board). By means of such novel electric coupling structure, the electromagnetic lens driving device can utilize the 6-pin Hall element to detect the X-and-Y axial positions of the movable frame relative to the substrate (first circuit board), and uses the control unit located on the substrate (first circuit board) to calculate, and then adjusts the biased auto-focusing and/or zooming point of the lens along the Z-axis direction by coupling the two pins (C1, C2) of the Hall element to the driving coil. Therefore, the goal of tri-axis close-loop feedback controlling for the auto-focusing module and the OIS module can be achieved.

While the present invention has been particularly shown and described with reference to a preferred embodiment, it will be understood by those skilled in the art that various changes in form and detail may be without departing from the spirit and scope of the present invention.

What is claimed is:

1. An electromagnetic lens driving device, comprising:
    a lens holder for holding a lens;
    a movable frame for receiving the lens holder in such a manner that the lens holder is movable relative to the movable frame along a Z-axis direction;
    a driving module, furnished between the movable frame and the lens holder for driving the lens holder to move within the movable frame along the Z-axis direction;
    a position detecting unit, furnished between the lens holder and the movable frame for detecting a position of the lens holder relative to the movable frame;
    an optical image stabilization (OIS) module for driving the movable frame together with the lens holder to perform bi-directional movements along an X-axis direction and a Y-axis direction; wherein the X-axis, Y-axis and Z-axis are perpendicular to each other;
    an electric coupling structure for at least coupling the position detecting unit and the driving module; said electric coupling structure comprising at least: two first coupling elements and two second coupling elements; one end of each one of said first coupling elements being connected to the driving module, and, the other end of each one of said first coupling elements being electrically connected to one end of a corresponding one of said second coupling elements, in addition, the other end of each one of said second coupling elements being electrically connected to the position detecting unit; wherein, the first coupling elements are located on and extending along a first plane, in addition, the second coupling elements are located on and extending along a second plane; wherein the first plane and the second plane are not the same plane; and
    a control unit, coupled to both the OIS module and the position detecting unit; the control unit being able to detect and control operations of the OIS module as well as to generate a control signal to the position detecting unit for controlling the driving module.

2. The electromagnetic lens driving device of claim 1, wherein said other ends of said second coupling elements are located at two opposite sides of the lens holder.

3. The electromagnetic lens driving device of claim 1, wherein said two second coupling elements are parallel to each other and are located at two opposite sides of the lens holder.

4. The electromagnetic lens driving device of claim 1, wherein, said first coupling elements are formed by a second spring plate; the second spring plate comprises at least two individual and separated second spring members; said second spring members are the first coupling elements; each one of the second spring members comprises: a second outer rim connected to the movable frame, a second inner rim fixed on the lens holder for flexibly retaining the lens holder along the Z-axis direction, at least one second inner string extending and connecting between the second outer rim and the second inner rim, and a second contact located at the second outer rim; said driving module is connected with the second inner rims; said second coupling element is connected with said second contact;
    wherein said second coupling element is formed by one of the following structures: bending a thin elongated extending part extended from the second contact toward a direction perpendicular to the second spring plate, and soldering a connecting wire at the second contact and let the connecting wire extending along a direction perpendicular to the second spring plate.

5. The electromagnetic lens driving device of claim 4, wherein:
    the first plane is perpendicular to the second plane;
    the driving module is an electromagnetic driving module comprising a driving coil, said the other ends of said first coupling elements are connected to two ends of the driving coil respectively;
    the position detecting unit is a Hall element coupled with both the driving coil of the electromagnetic driving module and the control unit by means of the electric coupling structure;
    the driving coil is furnished on one of the lens holder and the movable frame, while the Hall element is located on the other one of the lens holder and the movable frame.

6. The electromagnetic lens driving device of claim 5, further comprising a first circuit board; the control unit being furnished on the first circuit board and coupled with the OIS module; the OIS module being furnished between the first circuit board and the movable frame;
    wherein:
    the Hall element is located on the movable frame and having at least six pins for providing a feedback control function for the Z-axial positions of the lens holder; wherein, two of the at least six pins are coupled with two ends of the driving coil of the electromagnetic driving module for supplying a current to the electromagnetic driving module in order to control operations of the electromagnetic driving module; other four of the at least six pins are coupled with the control unit for receiving the control signal from the control unit in order to control the current supplied by the Hall element to the electromagnetic driving module based on the control signal, so as to achieve the function of tri-axis close-loop feedback controlling the electromagnetic driving module;
    the electric coupling structure comprises a first spring plate located at one side of the lens holder along the Z-axis direction; the first spring plate comprises at least four independent and separated first spring members; each one of these first spring members comprises a first inner rim for flexibly retaining a top position of the lens holder along the Z-axis direction and a first contact which is connected with one suspension wire; each one of the suspension wires extends from the first spring members toward the first circuit board and thus couples to the control unit;

the six pins of the Hall element are respectively coupled with the four first spring members and said two ends of the driving coil of the electromagnetic driving module, such that, the Hall element can receive a control signal from the control unit via the suspension wires in order to control and adjust a current provided by the Hall element to the electromagnetic driving module.

7. The electromagnetic lens driving device of claim 6, wherein the electromagnetic driving module comprises said driving coil furnished on the lens holder and at least two driving magnets mounted on the movable frame and corresponding to the driving coil; wherein the second inner rim of each second spring member is electric coupled with the driving coil of the electromagnetic driving module; in addition, the second contact of each second spring member is coupled to the Hall element.

8. The electromagnetic lens driving device of claim 6, wherein the first spring plate is in the form of hollowed out thin metal plate; in addition, each one of the first spring members of first spring plate comprises: a first outer rim connected to the movable frame, a first inner rim connected to the lens holder, at least one first inner string extending and connecting between the first outer rim and the first inner rim, and a first contact located at the first outer rim; each one of the suspension wires has its one end thereof being correspondingly connected to one of the first contacts.

9. The electromagnetic lens driving device of claim 6, wherein the electromagnetic lens driving device further comprises a second circuit board; the Hall element is furnished on the second circuit board; a sensing magnet for Z-axis position is furnished on the lens holder at a location corresponding to the Hall element; in addition, the end of each suspension wire which is connected to the first contact is coupled with the second circuit board, and thus is further coupled to one of the pins of the Hall element via the second circuit board.

10. The electromagnetic lens driving device of claim 6, wherein the OIS module comprises:
at least a first stabilizing coil furnished on the first circuit board and coupled to the control unit;
at least a second stabilizing coil furnished on the first circuit board and are perpendicular to the first stabilizing coils; in addition, the second stabilizing coils being coupled to the control unit;
at least a first stabilizing magnet mounted on the movable frame and corresponding to the first stabilizing coil;
at least a second stabilizing magnet mounted on the movable frame and corresponding to the second stabilizing coil; and
at least two position sensors mounted on the first circuit board and coupled to the control unit; the at least two position sensors being used to detect the position of the movable frame relative to the first circuit board along the X-axis direction and the Y-axis direction.

11. The electromagnetic lens driving device of claim 10, the first and second stabilizing magnets are the same with driving magnets of the electromagnetic driving module.

12. The electromagnetic lens driving device of claim 1, wherein the electric coupling structure comprises a first spring plate located at one side of the lens holder along the Z-axis direction; the first spring plate includes at least six independent and separated first spring members; wherein, among these six first spring members, there are four first spring members that each of these four first spring members includes a first contact which is coupled with the control unit by means of a suspension wire; while the other two first spring members do not connect to the suspension wires and are coupled to the electromagnetic driving module via a first inner rim thereof;
wherein the driving module comprises a driving coil furnished on the lens holder and at least two driving magnets mounted on the movable frame and corresponding to the driving coil;
wherein the first inner rim of each one of the other two first spring members is coupled with the coil of the electromagnetic driving module; in addition, a first outer rim of each one of the other two first spring members is coupled to a second circuit board where the position detecting unit is furnished on.

\* \* \* \* \*